(12) United States Patent
Oda et al.

(10) Patent No.: US 12,519,304 B2
(45) Date of Patent: Jan. 6, 2026

(54) POWER SUPPLY CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Kota Oda, Yokkaich (JP); Masaya Ina, Yokkaichi (JP); Shunichi Sawano, Yokkaichi (JP); Masayuki Kato, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 115 days.

(21) Appl. No.: 18/037,521

(22) PCT Filed: Oct. 29, 2021

(86) PCT No.: PCT/JP2021/039966
§ 371 (c)(1),
(2) Date: May 17, 2023

(87) PCT Pub. No.: WO2022/107572
PCT Pub. Date: May 27, 2022

(65) Prior Publication Data
US 2023/0402835 A1 Dec. 14, 2023

(30) Foreign Application Priority Data
Nov. 17, 2020 (JP) .................................. 2020-191093

(51) Int. Cl.
*H02H 5/04* (2006.01)
*G06F 1/28* (2006.01)

(52) U.S. Cl.
CPC ................. *H02H 5/04* (2013.01); *G06F 1/28* (2013.01)

(58) Field of Classification Search
CPC ................................................ H02H 5/04–048
See application file for complete search history.

(56) References Cited

U.S. PATENT DOCUMENTS

| | | | | |
|---|---|---|---|---|
| 2010/0254059 | A1* | 10/2010 | Higuchi | ................ H02H 7/228 361/103 |
| 2012/0261185 | A1 | 10/2012 | Murao et al. | |

(Continued)

FOREIGN PATENT DOCUMENTS

| | | |
|---|---|---|
| CN | 109357789 A | 2/2019 |
| DE | 112017003071 T5 | 3/2019 |

OTHER PUBLICATIONS

International Search Report, Application No. PCT/JP2021/039966, mailed Nov. 30, 2021. ISA/Japan Patent Office.

(Continued)

*Primary Examiner* — Thienvu V Tran
*Assistant Examiner* — Christopher J Clark
(74) *Attorney, Agent, or Firm* — Honigman LLP

(57) ABSTRACT

A power supply control device controls power supply through a wire. A first current output circuit is configured to output, to a temperature difference circuit, a current that is larger the larger a wire current, which flows through the wire is. The temperature difference circuit is configured to output a voltage that is higher the larger a temperature difference between a wire temperature of the wire and an ambient temperature in the surroundings of the wire is. A drive circuit is configured to interrupt a flow of the wire current if the output voltage of the temperature difference circuit is at least a voltage threshold.

7 Claims, 12 Drawing Sheets

(56) References Cited

U.S. PATENT DOCUMENTS

| | | |
|---|---|---|
| 2013/0163138 A1 | 6/2013 | Higuchi et al. |
| 2014/0321012 A1* | 10/2014 | Nakayama ............ H02M 1/088 |
| | | 361/57 |
| 2018/0358800 A1 | 12/2018 | Sawano et al. |
| 2019/0190255 A1* | 6/2019 | Illing ..................... H02H 3/087 |
| 2020/0136369 A1* | 4/2020 | Chauhan ........... H01L 23/49541 |
| 2021/0028615 A1* | 1/2021 | Mayer ................... H02H 3/006 |

OTHER PUBLICATIONS

German Patent and Trademark Office, Office Action Application No. 11 2021 006 026.0, dated Sep. 29, 2025.

* cited by examiner

POWER SUPPLY CONTROL DEVICE

CROSS-REFERENCE TO RELATED APPLICATIONS

This application is the U.S. national stage of PCT/JP2021/039966 filed on Oct. 29, 2021, which claims priority of Japanese Patent Application No. JP 2020-191093 filed on Nov. 17, 2020, the contents of which are incorporated herein.

TECHNICAL FIELD

The present disclosure relates to a power supply control device.

BACKGROUND

JP2009-130944A discloses a vehicular power supply control device for controlling power supply from a power source to loads via electrical wires. This power supply control device includes a microcomputer. The microcomputer calculates the wire temperature of the wires based on a wire current flowing through the wires. When the wire temperature calculated by the microcomputer is a predetermined temperature or higher, the flow of the wire current is interrupted. This prevents the wire temperature from increasing to an abnormal temperature.

According to an aspect of the present disclosure, a power supply control device for controlling power supply via a wire includes: a current output circuit configured to output a current that is larger the larger a wire current, which flows through the wire, is; a temperature difference circuit to which the current output by the current output circuit is input, and which is configured to output a voltage that is higher the larger a temperature difference between a wire temperature of the wire and an ambient temperature in the surroundings of the wire is; and an interruption unit configured to interrupt a flow of the wire current if the output voltage of the temperature difference circuit is at least a voltage threshold.

SUMMARY

In the power supply control device disclosed in JP2009-130944A, the microcomputer needs to calculate the wire temperature based on a wire current. Therefore, a high-performance, expensive microcomputer needs to be used.

Therefore, it is an object of the present disclosure to provide a power supply control device capable of preventing an increase in wire temperature to an abnormal temperature without performing any wire temperature-related calculation.

Advantageous Effects

According to the present disclosure, it is possible to prevent an increase in wire temperature to an abnormal temperature without performing any wire temperature-related calculation.

DETAILED DESCRIPTION OF PREFERRED EMBODIMENTS

Figure 1:
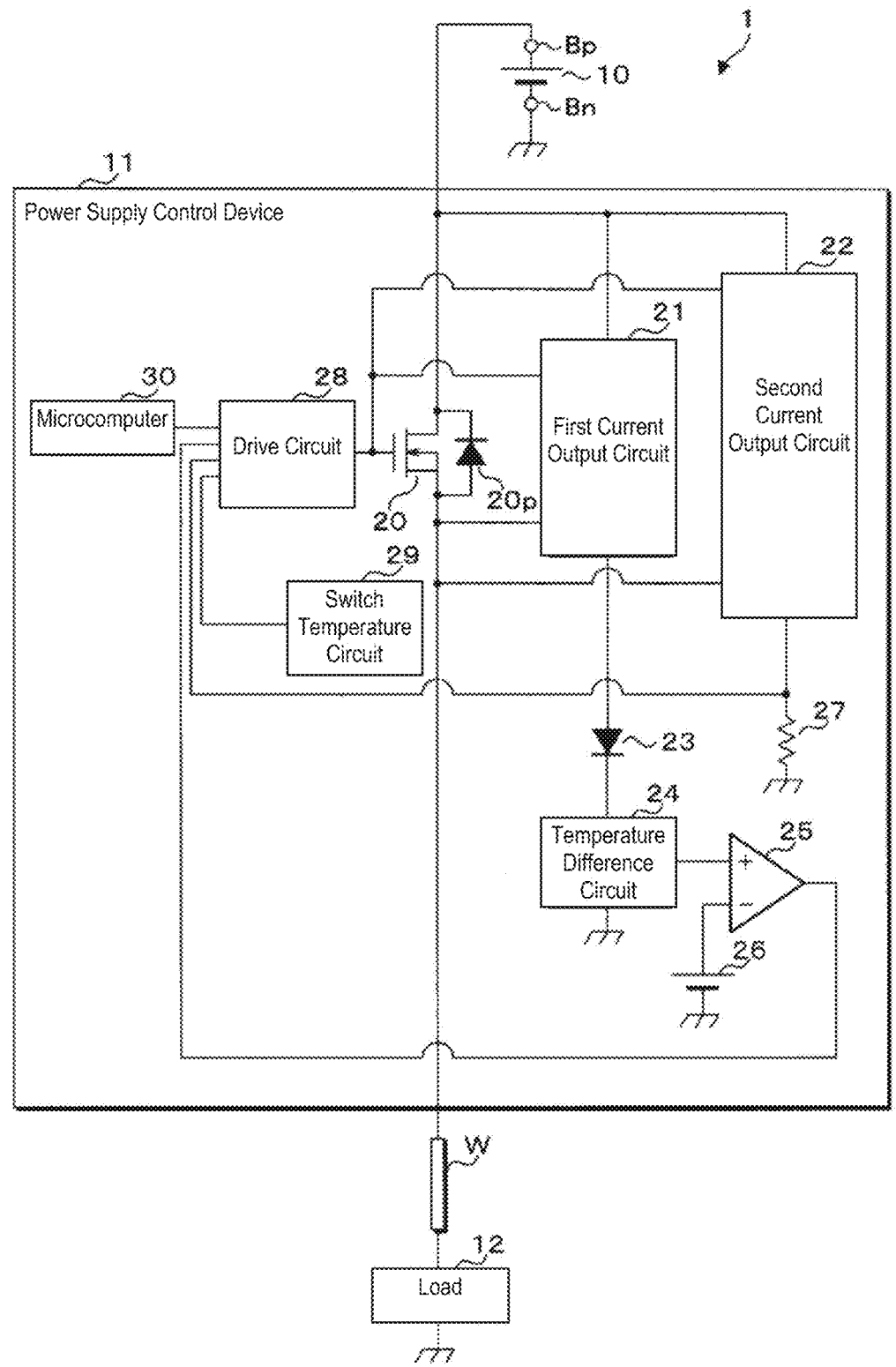
FIG. 1 is a block diagram illustrating a configuration of the main portion of a power source system according to Embodiment 1.

First, embodiments of the present disclosure will be listed and described. At least some of the embodiments described below may be combined with each other as appropriate.

According to an aspect of the present disclosure, a power supply control device for controlling power supply via a wire includes: a current output circuit configured to output a current that is larger the larger a wire current, which flows through the wire, is; a temperature difference circuit to which the current output by the current output circuit is input, and which is configured to output a voltage that is higher the larger a temperature difference between a wire temperature of the wire and an ambient temperature in the surroundings of the wire is; and an interruption unit configured to interrupt a flow of the wire current if the output voltage of the temperature difference circuit is at least a voltage threshold.

According to the foregoing aspect, in the temperature difference circuit, an output current of the current output circuit flows, and a voltage that corresponds to a temperature difference is output. Therefore, no wire temperature-related calculation is needed. If the output voltage of the temperature difference circuit is at least the voltage threshold, the flow of the wire current is interrupted. This prevents the wire temperature from increasing to an abnormal temperature.

The power supply control device according to an aspect of the present disclosure further includes: a switch provided in a current path for the wire current, and the interruption unit turns the switch off to interrupt the flow of the wire current.

According to the foregoing aspect, by turning the switch off, the flow of the wire current is interrupted.

In the power supply control device according to an aspect of the present disclosure, the interruption unit turns the switch off if a switch temperature of the switch is at least a temperature threshold.

According to the foregoing aspect, if the switch temperature is at least the temperature threshold, the switch is turned off. With this, the flow of the wire current through the switch and the wire is interrupted, and the switch temperature is reduced. As a result, this prevents the switch temperature from increasing to an abnormal temperature.

In the power supply control device according to an aspect of the present disclosure, the temperature difference circuit includes a capacitor, the capacitor is charged if heat is generated by the wire, and the capacitor discharges if heat is dissipated by the wire, and the output voltage of the temperature difference circuit is higher the higher a voltage across the capacitor is.

According to the foregoing aspect, the capacitor is charged if heat is generated by the wire. The capacitor discharges if heat is dissipated by the wire. When the amount of heat generated by the wire matches the amount of dissipated heat, the voltage across the capacitor is maintained at a fixed value. As a result, the output voltage of the temperature difference circuit is maintained at a fixed value.

The power supply control device according to an aspect of the present disclosure further includes: a processing unit for executing processing, and the processing unit is configured to: acquire an output voltage of the temperature difference circuit while the wire current flows, and determine whether or not the acquired output voltage is at least the voltage threshold, and if it is determined by the processing unit that the output voltage is at least the voltage threshold, the interruption unit interrupts the flow of the wire current.

According to the foregoing aspect, the determination of whether or not the output voltage of the temperature difference circuit is at least the voltage threshold is made by the processing unit.

In the power supply control device according to an aspect of the present disclosure, the interruption unit interrupts the flow of the wire current if the wire current is at least a current threshold.

According to the foregoing aspect, if the wire current is at least the current threshold, the flow of the wire current is interrupted. This prevents the wire current from increasing to a value that is greater than the current threshold.

The power supply control device according to an aspect of the present disclosure further includes: a processing unit for executing processing, and the processing unit is configured to: acquire an output voltage of the temperature difference circuit while the wire current flows, and determine whether or not the acquired output voltage is not greater than a second voltage threshold, and the second voltage threshold is smaller than the voltage threshold.

According to the foregoing aspect, the second voltage threshold is, for example, zero V or a positive value near zero V. When the wire current starts flowing, the output voltage of the temperature difference circuit instantaneously exceeds the second voltage threshold. By determining whether or not the output voltage of the temperature difference circuit is not greater than the second voltage threshold, an abnormality of the temperature difference circuit is detected.

The power supply control device according to an aspect of the present disclosure further includes a diode provided in a second current path for a current to flow through the current output circuit.

According to the foregoing aspect, since the diode is provided, a current does not flow through the temperature difference circuit and the current output circuit in this order.

DETAIL OF EMBODIMENTS OF PRESENT DISCLOSURE

The following will describe specific examples of a power source system according to the embodiments of the present disclosure with reference to the drawings. Note that the present disclosure is not limited to these examples but is defined by the claims, and all modifications within the meaning and scope equivalent to the claims are intended to be included.

Embodiment 1

Configuration of Power Source System

FIG. 1 is a block diagram showing a configuration of the main portion of a power source system 1 according to Embodiment 1. The power source system 1 is installed in a vehicle. The power source system 1 includes a vehicle power source 10, a power supply control device 11, and a load 12. The vehicle power source 10 is a direct-current (DC) power source and is, for example, a battery. The positive and negative electrodes of the vehicle power source 10 are respectively connected to a positive electrode terminal Bp and a negative electrode terminal Bn by a user.

The power supply control device 11 includes a main switch 20. The main switch 20 is an N-channel FET (Field Effect Transistor). When the main switch 20 is on, the resistance value between the drain and the source of the main switch 20 is sufficiently small. Therefore, a current can flow through the drain and the source of the main switch 20. When the main switch 20 is off, the resistance value between the drain and the source of the main switch 20 is sufficiently large. Therefore, no current flows through the drain and the source of the main switch 20.

A parasitic diode $20p$ is connected between the drain and the source of the main switch 20. The cathode and the anode of the parasitic diode $20p$ are respectively connected to the drain and the source of the main switch 20. The parasitic diode $20p$ is a diode formed inside the main switch 20.

The negative electrode terminal Bn is grounded. Grounding is realized by connecting the negative electrode terminal Bn to the body of the vehicle, for example. The positive electrode terminal Bp is connected to the drain of the main switch 20. The source of the main switch 20 is connected to one end of a wire W. The other end of the wire W is connected to one end of the load 12. The other end of the load 12 is grounded.

When the main switch 20 is on, a current flows from the positive electrode of the vehicle power source 10 through the main switch 20, the wire W, and the load 12 in this order. With this, power is supplied to the load 12. Since a current flows through the main switch 20 and the wire W, the main switch 20 is provided in a current path for a wire current to flow through the wire W. When the main switch 20 is off, no current flows through the main switch 20, the wire W, and the load 12. Therefore, no power is supplied to the load 12. By switching the main switch 20 between on and off, the power supply control device 11 controls power supply to the load 12 via the wire W.

The load 12 is electrical equipment. The load 12 operates when being supplied with power. The load 12 stops operating when the supply of power to the load 12 is stopped.

Configuration of Power Supply Control Device 11

The power supply control device 11 includes, in addition to the main switch 20, a first current output circuit 21, a second current output circuit 22, a back-flow prevention diode 23, a temperature difference circuit 24, a comparator 25, a DC power source 26, a current resistor 27, a drive circuit 28, a switch temperature circuit 29, and a microcomputer 30. The comparator 25 has a positive terminal, a negative terminal, and an output terminal.

The drain, the source, and the gate of the main switch 20 are connected to the first current output circuit 21. The drain, the source, and the gate of the main switch 20 are further connected to the second current output circuit 22. The first current output circuit 21 is connected to the anode of the back-flow prevention diode 23. The cathode of the back-flow prevention diode 23 is connected to the temperature difference circuit 24. The temperature difference circuit 24 is grounded. The temperature difference circuit 24 is further connected to the positive terminal of the comparator 25. The negative terminal of the comparator 25 is connected to the positive electrode of the DC power source 26. The negative electrode of the DC power source 26 is grounded. The second current output circuit 22 is further connected to one end of the current resistor 27. The other end of the current resistor 27 is grounded.

The gate of the main switch 20 is connected to the drive circuit 28. The drive circuit 28 is further connected to the output end of the comparator 25, the switch temperature circuit 29, and the microcomputer 30. The drive circuit 28 is further connected to a connection node between the second current output circuit 22 and the current resistor 27.

The main switch 20 is on when the voltage of the gate of the main switch with respect to the potential of the source is greater than or equal to a certain voltage. The main switch 20 is off when the voltage of the gate of the main switch with respect to the potential of the source is smaller than the certain voltage. The voltage of the gate with respect to a ground potential is hereinafter referred to as "gate voltage". The drive circuit 28 can step up the gate voltage to a fixed target voltage. With this, the voltage of the gate of the main switch 20 with respect to the potential of the source increases to a certain voltage or more. As a result, the main switch 20 is turned on.

The drive circuit 28 can also step down the gate voltage to zero V. With this, the voltage of the gate of the main switch 20 with respect to the potential of the source decreases to zero V As a result, the main switch 20 is turned off.

As described above, the drive circuit 28 adjusts the gate voltage to turn the main switch 20 on or off.

As described above, the drive circuit 28 can step up the gate voltage to the target voltage to turn the main switch 20 on. As described above, while the main switch 20 is on, a current flows from the positive electrode of the vehicle power source 10 to the main switch 20, the wire W, and the load 12 in this order. In response to the drive circuit 28 stepping up the gate voltage to the target voltage, the first current output circuit 21 and the second current output circuit 22 are activated.

The first current output circuit 21 draws a current that is proportional to the wire current flowing through the main switch 20 and the wire W, and outputs the drawn current. The output current of the first current output circuit 21 is input to the temperature difference circuit 24 via the back-flow prevention diode 23. Accordingly, the back-flow prevention diode 23 is provided in a second current path for a current that flows through the first current output circuit 21. The current that is output from the first current output circuit 21 is (wire current)/K1. Here, K1 has a predetermined fixed value and is, for example, 1000. Therefore, the output current of the first current output circuit 21 becomes larger as the wire current increases.

The temperature difference circuit 24 outputs a voltage with respect to the ground potential to the positive terminal of the comparator 25. The output voltage of the temperature difference circuit 24 becomes higher as the temperature difference between the wire temperature of the wire W and the ambient temperature in the surroundings of the wire W increases. The DC power source 26 includes, for example, a regulator. The regulator steps down the voltage of the drain of the main switch 20 with respect to the ground potential to a predetermined voltage threshold, and outputs the stepped down voltage to the negative terminal of the comparator 25.

If the output voltage of the temperature difference circuit 24 is smaller than the voltage threshold, the comparator 25 outputs a low-level voltage to the drive circuit 28. If the output voltage of the temperature difference circuit 24 is greater than or equal to the voltage threshold, the comparator 25 outputs a high-level voltage to the drive circuit 28.

The output voltage of the temperature difference circuit 24 is greater than or equal to the voltage threshold when the temperature difference of the wire W is greater than or equal to a predetermined temperature difference threshold. The output voltage of the temperature difference circuit 24 is smaller than the voltage threshold when the temperature difference of the wire W is less than the temperature difference threshold. Accordingly, if the temperature difference of the wire W is less than the temperature difference threshold, the comparator 25 will output a low-level voltage to the drive circuit 28. If the temperature difference of the wire W is greater than or equal to the temperature difference threshold, the comparator 25 will output a high-level voltage to the drive circuit 28. The voltage threshold is greater than zero V. The temperature difference threshold is greater than zero degrees.

As described above, the drive circuit 28 steps down the gate voltage to zero V to turn the main switch 20 off. When the main switch 20 is off, no current flows through the main switch 20 and the wire W. In response to the drive circuit 28 stepping down the gate voltage to zero V, the first current output circuit 21 stops operating. While the operation of the first current output circuit 21 is stopped, the first current output circuit 21 does not output a current and the output voltage of the temperature difference circuit 24 is zero V. Therefore, the comparator 25 outputs a low-level voltage.

As described above, the drive circuit 28 steps up the gate voltage to the target voltage to turn the main switch 20 on. In response to the drive circuit 28 stepping up the gate voltage to the target voltage, the first current output circuit 21 and the second current output circuit 22 are activated.

Similar to the first current output circuit 21, the second current output circuit 22 draws a current that is proportional to the wire current flowing through the main switch 20 and the wire W, and outputs the drawn current. The output current of the second current output circuit 22 is to flow the current resistor 27. The current that is output from the second current output circuit 22 is (wire current)/K2. Here, K2 denotes a predetermined fixed value and is, for example, 1000. Therefore, the current that is output from the second current output circuit 22 becomes larger as the wire current increases.

The voltage across the current resistor 27 is output to the drive circuit 28. The voltage across of the current resistor 27 is (resistance value of the current resistor 27)(wire current)/K2. The resistance value of the current resistor 27 is a fixed value, and thus the voltage across the current resistor 27 functions as wire current information, which indicates the wire current.

The switch temperature circuit 29 outputs, to the drive circuit 28, a voltage that is higher the higher the temperature of the main switch 20 is, as switch temperature information, which indicates the temperature of the main switch 20. Hereinafter, the temperature of the main switch 20 is referred to as "switch temperature".

The switch temperature circuit 29 has, for example, the following configuration. In the switch temperature circuit 29, the regulator can step down the voltage of the drain of the main switch 20 with respect to the ground potential to generate a certain voltage, and outputs the generated certain voltage. The certain voltage output by the regulator is divided by a thermistor and a resistor, and the divided voltage is output to the drive circuit 28 as the switch temperature information. The divided voltage varies depending on the resistance values of the thermistor and the resistor. The resistance value of the thermistor varies depending on the temperature of the thermistor. The thermistor is arranged in the vicinity of the main switch 20. Accordingly, the temperature of the thermistor increases with an increase in the switch temperature. The resistance value of the resistor is a fixed value. Accordingly, the voltage obtained by voltage division by the thermistor and the resistor varies depending on the switch temperature, and functions as the switch temperature information.

"Normal state" refers to a state of the power supply control device 11 in which the output voltage of the temperature difference circuit 24 is smaller than the voltage threshold, the wire current is smaller than a predetermined current threshold, and the switch temperature is smaller than a predetermined temperature threshold. "Abnormal state" refers to a state of the power supply control device 11 in which the output voltage of the temperature difference circuit 24 is greater than or equal to the voltage threshold, the wire current is greater than or equal to the predetermined current threshold, or the switch temperature is greater than or equal to the temperature threshold. Whether or not the output voltage of the temperature difference circuit 24 is smaller than the voltage threshold is determined based on whether or not the output voltage of the comparator 25 is a low-level voltage.

The microcomputer 30 outputs a high-level voltage or a low-level voltage to the drive circuit 28. To activate the load 12, the microcomputer 30 switches the output voltage to a high-level voltage. In response to the microcomputer 30 switching the output voltage to a high-level voltage while the power supply control device 11 is in the normal state, the drive circuit 28 turns the main switch 20 on. With this, power is supplied to the load 12. As a result, the load 12 is activated.

To deactivate the load 12, the microcomputer 30 switches the output voltage to a low-level voltage. In response to the microcomputer 30 switching the output voltage to a low-level voltage, the drive circuit 28 turns the main switch 20 off. With this, the power supply to the load 12 is stopped. As a result, the load 12 is deactivated.

If, during the on state of the main switch 20, the power supply control device 11 changes to the abnormal state, the drive circuit 28 will turn the main switch 20 off regardless of the output voltage of the microcomputer 30. Accordingly, in response to the output voltage of the temperature difference circuit 24 increasing to a voltage greater than or equal to the voltage threshold, the drive circuit 28 turns the main switch 20 off. In response to the wire current increasing to a current greater than or equal to the current threshold, the drive circuit 28 turns the main switch 20 off. In response to the switch temperature increasing to a temperature greater than or equal to the temperature threshold, the drive circuit 28 turns the main switch 20 off. When the main switch 20 is turned off, the flow of the wire current is interrupted. The drive circuit 28 functions as an interruption unit.

When the main switch 20 is turned off, the wire W and the main switch stop generating heat, and only discharge heat. With this, the wire temperature of the wire W and the switch temperature of the main switch 20 decrease.

This prevents an increase in the wire temperature and the switch temperature to an abnormal temperature. Also, the wire current is prevented from increasing to a value that is greater than the current threshold.

Configuration of First Current Output Circuit

Figure 2:
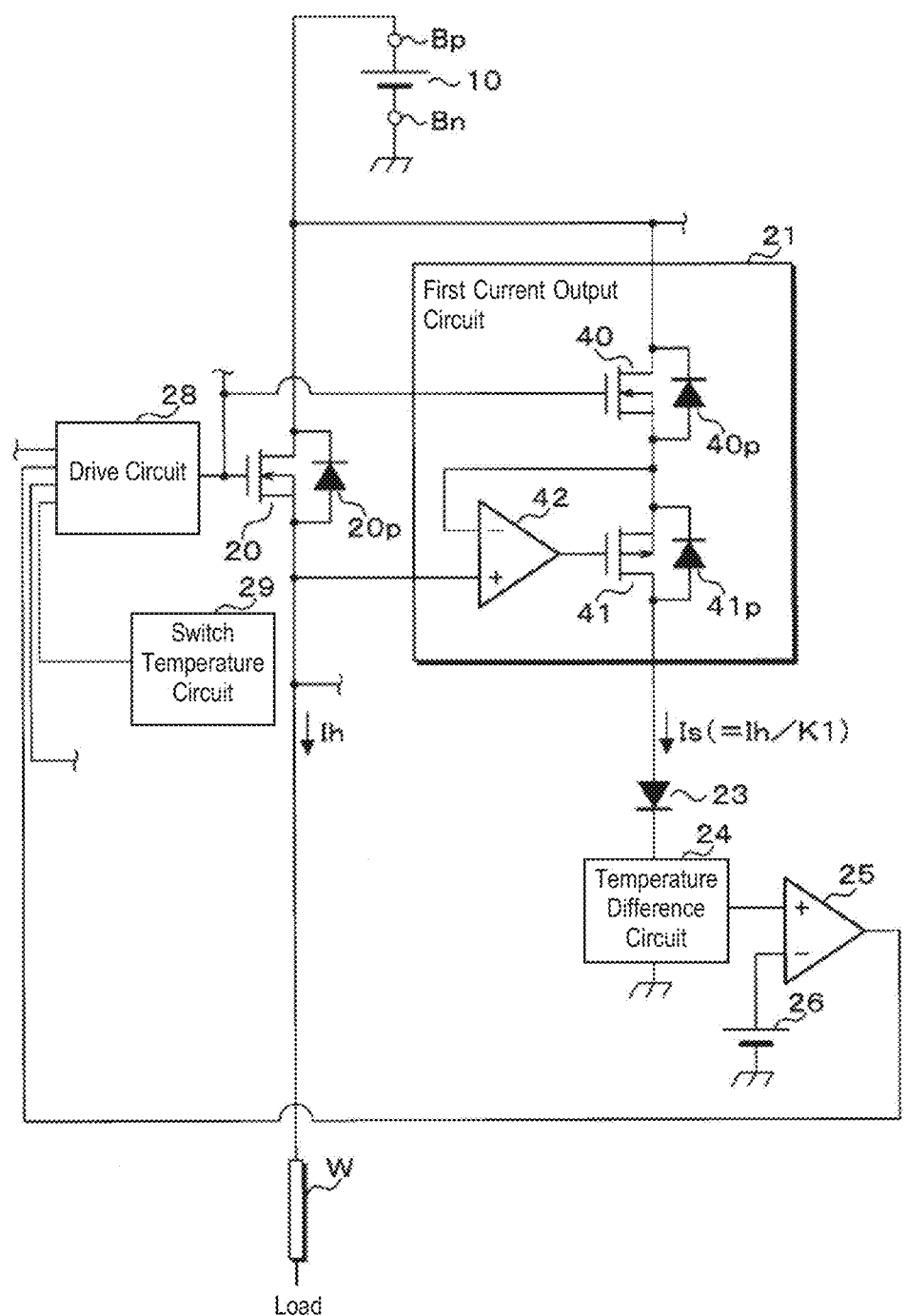
FIG. 2 is a circuit diagram of a first current output circuit.

FIG. 2 is a circuit diagram of the first current output circuit 21. The first current output circuit 21 includes a sub switch 40, a transistor 41, and a differential amplifier 42. The sub switch 40 is an N-channel FET. A parasitic diode 40p is connected between the drain and the source of the sub switch 40. The cathode and the anode of the parasitic diode 40p are respectively connected to the drain and the source of the sub switch 40. The parasitic diode 40p is formed inside the sub switch 40. The transistor 41 is a P-channel FET. A parasitic diode 41p is connected between the drain and the source of the transistor 41. The cathode and the anode of the parasitic diode 41p are respectively connected to the source and the drain of the transistor 41. The parasitic diode 41p is formed inside the transistor 41. The differential amplifier 42 has a positive terminal, a negative terminal, and an output terminal.

The drain and the gate of the sub switch 40 are respectively connected to the drain and the gate of the main switch 20. The source of the sub switch 40 is connected to the source of the transistor 41. The drain of the transistor 41 is connected to the anode of the back-flow prevention diode 23. The drain and the gate of the transistor 41 are respectively connected to the negative terminal and the output terminal of the differential amplifier 42. The positive terminal of the differential amplifier 42 is connected to the source of the main switch 20.

The sub switch 40 is on when the voltage of the gate of the sub switch 40 with respect to the potential of the source is greater than or equal to a certain voltage. When the sub switch 40 is on, the resistance value between the drain and the source of the sub switch 40 is sufficiently small. Therefore, a current can flow through the drain and the source of the sub switch 40. The sub switch 40 is off when the voltage of the gate of the sub switch 40 with respect to the potential of the source is smaller than the certain voltage. When the sub switch 40 is off, the resistance value between the drain and the source of the sub switch 40 is sufficiently large. Therefore, no current flows through the drain and the source of the sub switch 40.

As described above, the drive circuit 28 can step up the gate voltage to the target voltage to turn the main switch 20 on. When the gate voltage is stepped up to the target voltage by the drive circuit 28, the voltage of the gate of the sub switch with respect to the potential of the source is greater than or equal to a certain voltage, and thus the sub switch 40 is on. When the sub switch 40 is on, a current flows through the drain of the sub switch 40, the source of the sub switch 40, the source of the transistor 41, the drain of the transistor 41, the back-flow prevention diode 23, and the temperature difference circuit 24 in this order.

As described above, the drive circuit 28 steps down the gate voltage of the main switch 20 to zero V to turn the main switch 20 off. When the gate voltage is stepped down to zero V by the drive circuit 28, the voltage of the gate of the sub switch 40 with respect to the potential of the source is smaller than the certain voltage, and thus the sub switch 40 is off. When the sub switch 40 is turned off, the current flow through the sub switch 40 and the transistor 41 is interrupted.

As described above, the drive circuit 28 turns the sub switch 40 on to turn the main switch 20 on. As described above, the drive circuit 28 turns the sub switch 40 off to turn the main switch 20 off. When the sub switch 40 is on, the first current output circuit 21 is activated and outputs a current. When the sub switch 40 is off, the first current output circuit 21 is deactivated and does not output any current.

In the transistor 41, a current flows through the source and the drain in this order. In the transistor 41, the voltage of the gate with respect to the potential of the source is referred to as "adjustment voltage". The higher the adjustment voltage is, the higher the resistance value between the source and the drain of the transistor 41 is. The differential amplifier 42 amplifies the potential of the source of the main switch 20 with respect to the potential of the source off the sub switch 40, and outputs the amplified voltage to the gate of the transistor 41. Hereinafter, the voltage of the source of the main switch 20 with respect to the potential of the source of the sub switch 40 is referred to as "source differential voltage".

The higher the source differential voltage is, the higher the output voltage of the differential amplifier 42 is. The higher the output voltage of the differential amplifier 42 is, the higher the adjustment voltage of the transistor 41 is. As described above, the higher the adjustment voltage is, the larger the resistance value between the source and the drain of the transistor 41 is. Accordingly, the differential amplifier 42 adjusts the resistance value between the source and the drain of the transistor 41 to a larger value as the source differential voltage increases.

If the voltage of the source of the main switch 20 is reduced to a voltage smaller than the source voltage of the sub switch 40, the source differential voltage will decrease. In this case, the differential amplifier 42 reduces the resistance value between the source and the drain of the transistor 41. With this, a current flowing through the drain and the source of the sub switch 40 increases. As a result, the range of the voltage drop occurring at the transistor 41 increases and the voltage of the source of the sub switch 40 decreases.

If the voltage of the source of the main switch 20 is increased to a voltage greater than the source voltage of the sub switch 40, the source differential voltage will increase. In this case, the differential amplifier 42 increases the resistance value between the source and the drain of the transistor 41. With this, a current flowing through the drain and the source of the sub switch 40 decreases. As a result, the range of the voltage drop occurring at the transistor 41 decreases and the voltage of the source of the sub switch 40 increases.

As described above, the differential amplifier 42 adjusts the resistance value between the source and the drain of the transistor 41 so that the voltage of the source of the main switch 20 matches the voltage of the source of the sub switch 40.

The resistance value between the drain and the source of the main switch 20 when the main switch 20 is on is denoted as Rm. The resistance value between the drain and the source of the sub switch 40 when the sub switch 40 is on is denoted as Rs. The wire current is denoted as Ih. The output voltage of the first current output circuit 21 is denoted as Is. The voltage across the vehicle power source 10 is denoted as Vh.

The voltage of the source of the main switch 20 with respect to the ground potential is Vh−(Rm·Ih), where "·" means multiplication. The voltage of the source of the sub switch 40 with respect to the ground potential is Vh−(Rs·Is). Since the differential amplifier 42 adjusts the voltage of the source of the main switch 20 so that it equals to the voltage of the source of the sub switch 40, the following expression is satisfied.

$$Vh-(Rm \cdot Ih) = Vh-(Rs \cdot Is)$$

By expanding this expression, the wire current Ih is given by the following expression:

$$Ih = (Rs/Rm) \cdot Is$$

The above-described predetermined value K1 is Rs/Rm. The output voltage Ih of the first current output circuit 21 is given by the following expression:

$$Is = Ih/K1$$

As described above, the predetermined value K1 is a fixed value and is, for example, 1000. The resistance value Rm of the main switch 20 varies depending on the switch temperature of the main switch 20. However, the predetermined value K1 is maintained at a fixed value regardless of the switch temperature.

The higher the temperature of the main switch 20 is, the larger the resistance value Rm of the main switch 20 is. The resistance value Rs of the sub switch 40 varies depending on the temperature of the sub switch 40. The higher the temperature difference of the sub switch 40 is, the larger the resistance value Rs of the sub switch 40 is. The sub switch 40 is arranged in the vicinity of the main switch 20. Therefore, if the temperature of the main switch 20 increases, the temperature of the sub switch 40 will also increase. If, as a result of the increase in the temperature of the main switch 20, the resistance value Rm increases, the resistance value Rs will also increase. Accordingly, K1 does not vary depending on the temperature of the main switch 20, but is maintained at a fixed value.

The output current Is of the first current output circuit 21 is sufficiently smaller than the wire current Ih. Therefore, an FET that permits a small amount of current that flows through its drain and source is used as the sub switch 40 and the transistor 41. In this case, an amount of current that is permitted to flow through the parasitic diodes 40p and 41p is also small.

If the user connects, by mistake, the positive electrode and the negative electrode of the vehicle power source 10 to the negative electrode terminal Bn and the positive electrode terminal Bp respectively, a large current may flow through the parasitic diodes 40p and 41p if no back-flow prevention diode 23 is provided. However, the power supply control device 11 is provided with the back-flow prevention diode 23. Therefore, even if the positive electrode and the negative electrode of the vehicle power source 10 are respectively connected to the negative electrode terminal Bn and the positive electrode terminal Bp, no current will flow through the temperature difference circuit 24 and the first current output circuit 21 in this order. As a result, no current will flow through the parasitic diodes 40p and 41p.

Configuration of Second Current Output Circuit 22

The second current output circuit 22 has the same configuration as that of the first current output circuit 21. The drain of the transistor 41 of the second current output circuit 22 is connected to one end of the current resistor 27. The output current of the second current output circuit 22 is Ih/K2. The sub switch 40 of the second current output circuit 22 is also arranged in the vicinity of the main switch 20. Therefore, the predetermined value K2, similar to the predetermined value K1, is maintained at a fixed value regardless of the switch temperature of the main switch 20.

Thermal Circuit of Wire W

Figure 3:
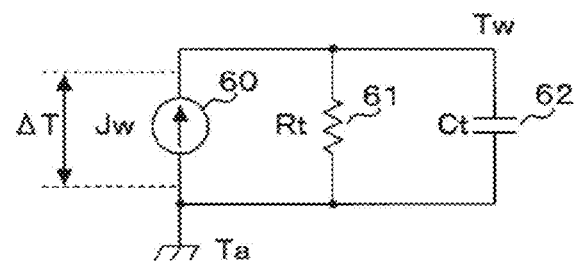
FIG. 3 is a thermal circuit diagram of a wire.
Figure 3:
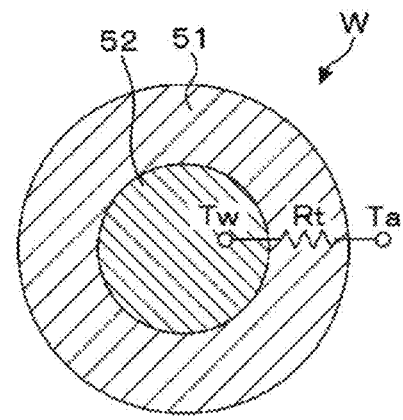

FIG. 3 is a thermal circuit diagram of the wire W. The temperature difference circuit 24 is a circuit through which a current flows in the same manner as heat (conducted) through the thermal circuit of the wire W. The following will describe a thermal circuit of the wire W. In the lower portion of FIG. 3, a cross section of the wire W is shown. As shown in the lower portion of FIG. 3, the wire W has a rod-shaped conductor 50 through which a current flows, and the outer surface of the conductor 50 is covered with an insulator 51. The thermal circuit shown in the upper portion of FIG. 3 is the thermal circuit when the wire W includes the conductor 50 and the insulator 51. The wire current flows through the conductor 50. When the wire current flows through the conductor 50, heat is generated from the conductor 50.

The thermal circuit of the wire W includes a heat source 60, a first thermal resistor 61, and a first thermal capacitor 62. The first thermal resistor 61 and the first thermal capacitor 62 are connected in parallel to the heat source 60. The heat source 60 outputs heat toward one end of the first thermal resistor 61 and one end of the first thermal capacitor 62. The temperature at the ends, on one side, of the first thermal resistor 61 and the first thermal capacitor 62 corresponds to a wire temperature of the wire W. The temperature at the ends, on the other side, of the first thermal resistor 61 and the first thermal capacitor 62 corresponds to an ambient temperature in the surroundings of the wire W.

Part of the heat generated by the heat source 60 is dissipated to the outside of the wire W via the first thermal resistor 61. The remaining heat generated by the heat source 60 is accumulated in the first thermal capacitor 62. The heat accumulated in the first thermal capacitor 62 is dissipated to the outside of the wire W via the first thermal resistor 61. The difference between the temperatures at two ends of the heat source 60 is the temperature difference between the wire temperature and the ambient temperature. In the example shown in FIG. 3, the first thermal resistor 61 is a thermal resistor of the insulator 51.

The heat amount of heat that is output by the heat source 60 is denoted as Jw. The resistance value of the first thermal resistor 61 is denoted as Rt. The capacitance value of the first thermal capacitor 62 is denoted as Ct. The wire temperature, the ambient temperature, and the temperature difference are respectively denoted as Tw, Ta, and $\Delta T$. The resistance value of the wire W is denoted as Rw. As described above, the wire current is denoted as Ih.

When heat is generated in the wire W, the temperature difference $\Delta T$ is given by the following expression (1):

$$\Delta T = Jw \cdot Rt \cdot \{1 - \exp(-t/(Ct \cdot Rt))\} \quad (1)$$

Here, t is a period in which the wire W is generating heat, that is, a current flow period in which a current flows through the wire W. Also, the heat amount Jw is given by the following expression (2):

$$Jw = Ih^2 \cdot Rw \quad (2)$$

The heat amount Jw varies depending on the wire current Ih.

The temperature difference threshold is denoted as $\Delta Tth$. The wire current Ih when the temperature difference $\Delta T$ is equal to the temperature difference threshold $\Delta Tth$ is denoted as If.

The wire current If is given by the following expression (3), using the expressions (1) and (2):

[Formula 1]

$$If = \frac{\sqrt{\Delta Tth}}{\sqrt{Rw \cdot Rt}} \cdot \frac{1}{\sqrt{1 - \exp\left(-\frac{t}{Ct \cdot Rt}\right)}} \quad (3)$$

Configuration of Temperature Difference Circuit 24

Figure 4:
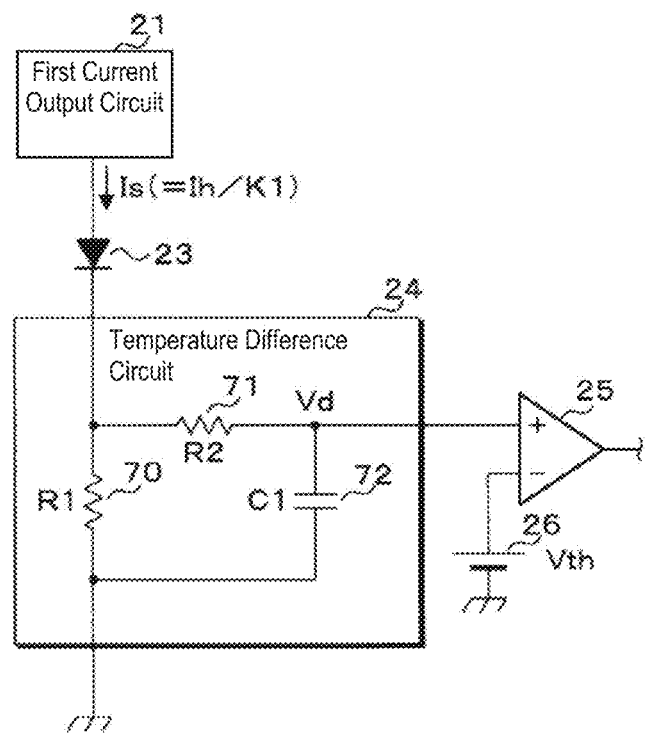
FIG. 4 is a circuit diagram illustrating a first example of a temperature difference circuit.

FIG. 4 is a circuit diagram showing a first example of the temperature difference circuit 24. In the first example, the temperature difference circuit 24 includes a first resistor 70, a second resistor 71, and a first capacitor 72. One end of the first resistor 70 is connected to the cathode of the back-flow prevention diode 23. The other end of the first resistor 70 is grounded. The one end of the first resistor 70 is connected to one end of the second resistor 71. The other end of the second resistor 71 is connected to one end of the first capacitor 72. The other end of the first capacitor 72 is grounded. The one end of the first capacitor 72 is connected to the positive terminal of the comparator 25.

Part of the output current of the first current output circuit 21 flows through the first resistor 70. The remaining output current of the first current output circuit 21 flows into the first capacitor 72 via the second resistor 71. With this, power is accumulated in the first capacitor 72. If power has accumulated in the first capacitor 72, a current will flow from the one end of the first capacitor 72 to the second resistor 71 and the first resistor 70 in this order, and the first capacitor 72 will discharge.

Accordingly, a current flow through the temperature difference circuit 24 is similar to heat conduction in the thermal circuit of the wire W. The first example of the temperature difference circuit 24 corresponds to the thermal circuit shown in the upper portion of FIG. 3.

The voltage across the first capacitor 72 is output, as an output voltage of the temperature difference circuit 24, to the positive terminal of the comparator 25. The voltage across the DC power source 26, that is, the voltage threshold is denoted as Vth. As described above, if the output voltage of the temperature difference circuit 24 is smaller than the voltage threshold Vth, the comparator 25 will output a low-level voltage to the drive circuit 28. If the output voltage of the temperature difference circuit 24 is greater than or equal to the voltage threshold Vth, the comparator 25 outputs a high-level voltage to the drive circuit 28.

The voltage across the first capacitor 72 is denoted as Vd. The resistance values of the first resistor 70 and the second resistor 71 are respectively denoted as R1 and R2. The capacitance value of the first capacitor 72 is denoted as C1. When a current is flowing through the wire W, that is, heat is generated in the wire W, the voltage Vd across the first capacitor 72 is given by the following expression (4). Here, t is the above-described current flow period.

[Formula 2]

$$Vd = \frac{Ih \cdot R1}{K1} \cdot \left\{1 - \exp\left(-\frac{t}{C1 \cdot (R1 + R2)}\right)\right\} \quad (4)$$

The wire current Ih when the voltage Vd across the first capacitor 72 is equal to the voltage threshold Vth is denoted as Ir. Ir is given by the following expression (5):

[Formula 3]

$$Ir = \frac{K1 \cdot Vth}{R1} \cdot \frac{1}{1 - \exp\left(-\frac{t}{C1 \cdot (R1 + R2)}\right)} \quad (5)$$

The following will describe how to determine the constants. The resistance value Rw of the wire W and the capacitance value Ct of the first thermal capacitor 62 are predetermined based on the structure of the wire W. The temperature difference threshold ΔTth is set to a value at which the wire W does not smoke even if the ambient temperature in the surroundings of the wire W has the maximum value. For example, it is assumed that the maximum value of the ambient temperature is 80 degrees. In a configuration in which heat generation in the wire W is stopped when the wire temperature is 100 degrees, the temperature difference threshold ΔTth is set to 20 degrees.

Based on the expressions (3) and (5), the predetermined value K1, the voltage threshold Vth, the resistance values R1 and R2, and the capacitance value C1 are determined so that Ir and If substantially match with respect to a suitable current flow period t. Specifically, the predetermined value K1, the voltage threshold Vth, the resistance values R1 and R2, and the capacitance value C1 are determined so that the following expressions (6) and (7) are substantially satisfied with respect to a suitable current flow period t.

[Formula 4]

$$\frac{\sqrt{\Delta Tth}}{\sqrt{Rw \cdot Rt}} = \frac{K1 \cdot Vth}{R1} \quad (6)$$

$$\sqrt{1 - \exp\left(-\frac{t}{Ct \cdot Rt}\right)} = 1 - \exp\left(-\frac{t}{C1 \cdot (R1 + R2)}\right) \quad (7)$$

Note that a square root is used in the left-hand member of the expression (7). No square root is used in the right-hand member of the expression (7). Therefore, it is impossible to determine the resistance values R1 and R2, and the capacitance value C1 that satisfy the expression (7), with respect to all current flow periods t. Therefore, with respect to the expression (7), the resistance values R1 and R2, and the capacitance value C1 are determined so that the values of the left-hand member and the right-hand member that correspond to a suitable current flow period t are not greater than a predetermined fixed set value. With respect to the expression (6), the predetermined value K1, the voltage threshold Vth, and the resistance value R1 are determined so that the value of the left-hand member and the value of the right-hand member are equal to each other.

If a plurality of constants of the temperature difference circuit 24 are determined in the above-described manner, the current flow through the temperature difference circuit 24 is similar to the heat conduction in the thermal circuit of the wire W. In the thermal circuit of the wire W, if heat is generated by the wire W, the heat is accumulated in the first thermal capacitor 62. At this time, in the temperature difference circuit 24, the first capacitor 72 is charged. In the thermal circuit of the wire W, heat is dissipated from the first thermal capacitor 62 to the outside of the wire W. With this, the wire W dissipates the heat. When the heat amount of the heat generated from the wire W matches the heat amount of the heat dissipated from the first thermal capacitor 62, the heat amount of the heat accumulated in the first thermal capacitor 62 is maintained at a fixed value. At this time, the voltage across the first capacitor 72 is also maintained at a fixed value. When the heat is dissipated by the wire W, the first capacitor 72 discharges. The output voltage of the temperature difference circuit 24 is higher the higher the voltage across the first capacitor 72 is.

Operation Example of Power Supply Control Device 11

Figure 5:
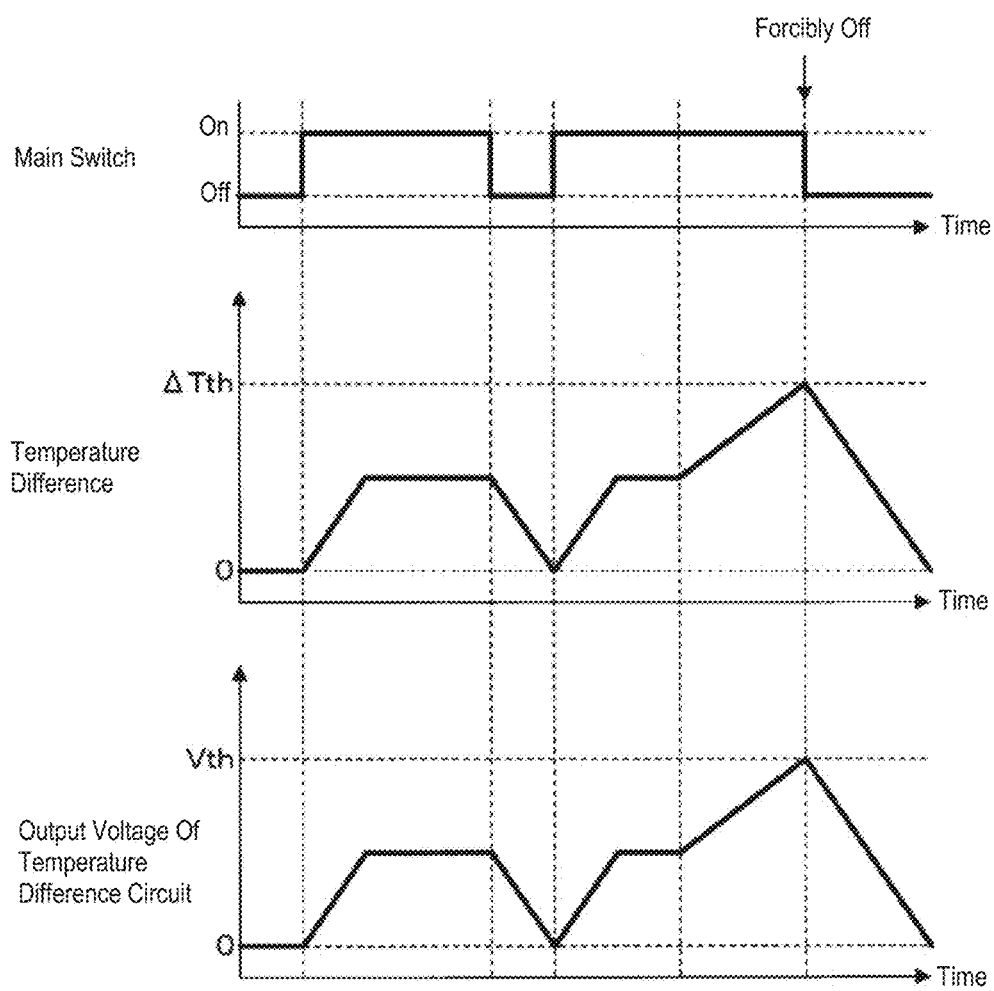
FIG. 5 is a timing chart illustrating an operation example of a power supply control device.

FIG. 5 is a timing chart illustrating an operation example of the power supply control device 11. FIG. 5 shows a transition of the state of the main switch 20, a transition of the temperature difference, and a transition of the output voltage of the temperature difference circuit 24. Time is given at the horizontal axes of the transitions. As shown in FIG. 5, in response to the drive circuit 28 turning the main switch 20 on, the wire current flows through the wire W, and the temperature difference between the wire temperature and the ambient temperature increases. With the increase in the temperature difference, the output voltage of the temperature difference circuit 24 also increases.

When the heat amount of heat generated by the wire W matches the heat amount of heat dissipated from the wire W, the temperature difference is stabilized at a value less than the temperature difference threshold ΔTth. When the temperature difference is stabilized at a value less than the temperature difference threshold ΔTth, the output voltage of the temperature difference circuit 24 is stabilized at a value less than the voltage threshold Vth.

In response to the drive circuit 28 turning the main switch 20 off, the flow of the wire current is interrupted, and thus the wire W stops generating heat. When the heat generation of the wire W is stopped, the wire W only dissipates heat. As a result, the temperature difference decreases. With a decrease in the temperature difference, the output voltage of the temperature difference circuit 24 also decreases. When the temperature difference reaches zero degrees, the output voltage of the temperature difference circuit 24 is reduced to zero V.

As described above, when a predetermined time has passed after turning on of the main switch 20 by the drive circuit 28, the temperature difference is stabilized at a value less than the temperature difference threshold ΔTth. Here, it is assumed that the wire current increases and the temperature difference starts increasing. In this case, since the wire current increases, the temperature difference threshold also starts increasing. When the temperature difference reaches the temperature difference threshold ΔTth, the output voltage of the temperature difference circuit 24 reaches the voltage threshold Vth. In response to the output voltage of the temperature difference circuit 24 reaching the voltage threshold Vth, the comparator 25 outputs a high-level voltage. In response to the output voltage of the comparator 25 being switched to a high-level voltage, the drive circuit 28 turns the main switch 20 off regardless of the output voltage of the microcomputer 30, and maintains the main switch 20 to be turned off.

When the main switch 20 is turned off, the temperature difference, that is, the wire temperature decreases, as described above. With the decrease in the temperature difference, the output voltage of the temperature difference circuit 24 also decreases. The drive circuit 28 cancels the off state of the main switch 20 if a predetermined condition is satisfied. Examples of the predetermined condition include a condition that the output voltage of the microcomputer 30 is switched from a high-level voltage to a low-level voltage.

Effects of Power Supply Control Device 11

Figure 6:
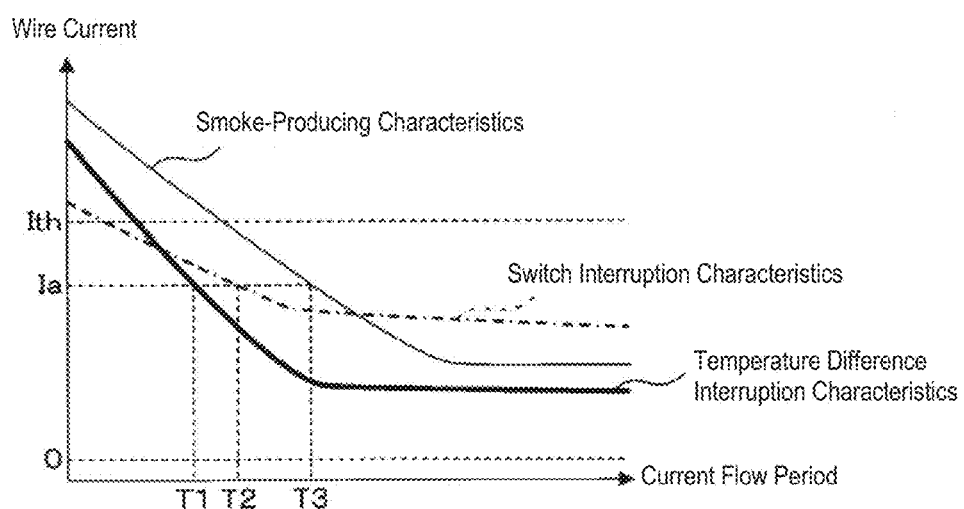
FIG. 6 is a diagram illustrating effects of the power supply control device.

FIG. 6 is a diagram illustrating effects of the power supply control device 11. In FIG. 6, smoke-producing characteristics, switch interruption characteristics, and temperature difference interruption characteristics are respectively indicated by a thin solid line, a dashed line, and a bold solid line. Regarding the smoke-producing characteristics, current flow periods from the start of flowing of the wire current to smoke generation of the wire W for various types of wire currents are indicated. Regarding the switch interruption characteristics, current flow periods from the start of flowing of the wire current to a point in time when the switch temperature reaches the temperature threshold for various types of wire currents are indicated. Regarding the temperature difference interruption characteristics, current flow periods from the start of flowing of the wire current to a point in time when the output voltage of the temperature difference circuit 24 reaches the voltage threshold for various types of wire currents are indicated.

In FIG. 6, when the wire current is Ia, the output voltage of the temperature difference circuit 24 reaches the voltage threshold at the current flow period of T1. In the same case, the switch temperature reaches the temperature threshold at the current flow period of T2. In the same case, the wire W generates smoke at the current flow period of T3. The current flow periods T1 and T2 are shorter than the current flow period T3. Therefore, in the case where the wire current is Ia, the main switch 20 is turned off and the flow of a wire current is interrupted before the wire W generates smoke.

As described above, when the wire current indicated by wire current information is greater than or equal to the current threshold, the drive circuit 28 turns the main switch 20 off regardless of the output voltage of the microcomputer In FIG. 6, the current threshold is denoted as Ith. When the wire current is greater than or equal to the current threshold Ith, the drive circuit 28 turns the main switch 20 off regardless of the current flow period, and interrupts the flow of the wire current.

The smoke-producing characteristics and the switch interruption characteristics are compared next. As shown in FIG. 6, when the wire current is large, the switch temperature reaches the temperature threshold before the wire W generates smoke. Therefore, the main switch 20 is turned off before the wire W generates smoke. However, when the wire current is small, the wire W generates smoke before the switch temperature reaches the temperature threshold. Accordingly, in a configuration in which interruption is not performed based on a temperature difference, the wire temperature increases to an abnormal temperature when the wire current is small.

However, when the wire current is small, the output voltage of the temperature difference circuit 24 reaches the voltage threshold, and thus the main switch 20 is turned off before the wire W generates smoke. As a result, regarding a suitable wire current, the drive circuit 28 turns the main switch 20 off before the wire W generates smoke. As a result, the wire temperature is prevented from increasing to an abnormal temperature.

As described above, in the temperature difference circuit 24, the output current of the first current output circuit 21 flows, and a voltage that corresponds to the temperature difference between a wire temperature and an ambient temperature is output. Accordingly, no wire temperature-related calculation is needed.

If the wire W has a structure different from the structure shown in the lower portion of FIG. 3, the wire W has a thermal circuit different from that shown in the upper portion of FIG. 3. The structure of the temperature difference circuit 24 is changed according to the thermal circuit of the wire W. The following will describe other examples of the temperature difference circuit 24.

Second Example of Temperature Difference Circuit 24

Figure 7:
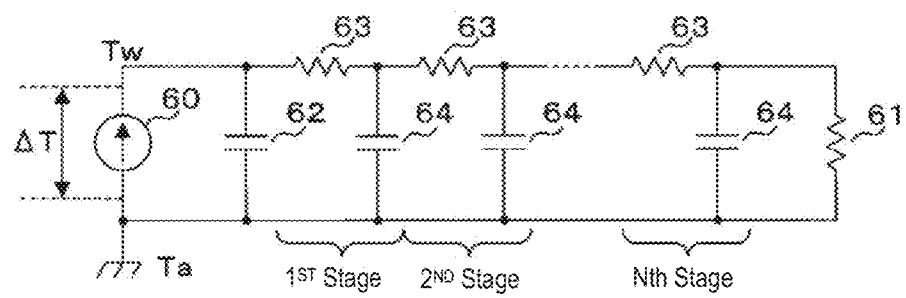
FIG. 7 is a circuit diagram illustrating a second example of the temperature difference circuit.
Figure 7:
Figure 7:
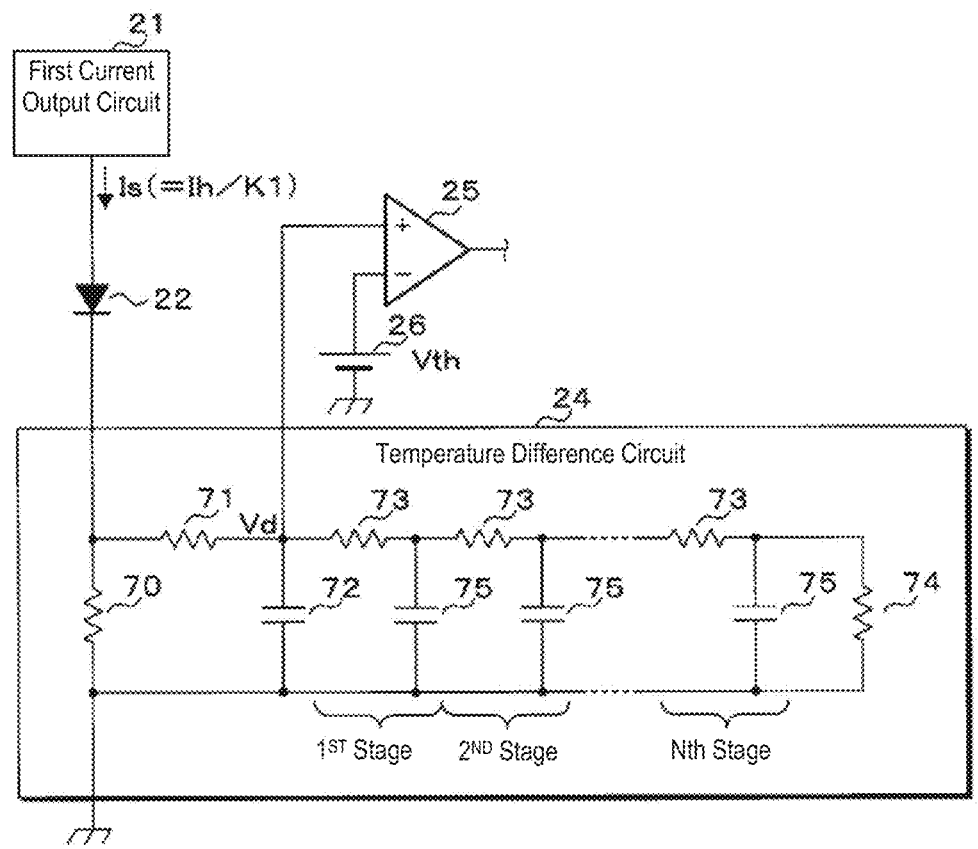

FIG. 7 is a circuit diagram showing a second example of the temperature difference circuit 24. In the upper portion of FIG. 7, a thermal circuit of the wire W is shown. In the lower portion of FIG. 7, the temperature difference circuit 24 that corresponds to the thermal circuit of the wire W is shown.

In the upper portion of FIG. 7, a multi-stage Cauer model is shown. As shown in the upper portion of FIG. 7, in the second example, the thermal circuit of the wire W includes, in addition to the heat source 60, the first thermal resistor 61 and the first thermal capacitor 62, N second thermal resistors 63 and N second thermal capacitors 64. N thermal RC circuits each constituted by a second thermal resistor 63 and a second thermal capacitor 64 are arranged between the first thermal capacitor 62 and the first thermal resistor 61. N is an integer. One end of the first thermal capacitor 62 is connected to one end of the first thermal resistor 61 via the N second thermal resistors 63. Ends of the second thermal capacitors 64 on one side are connected to ends of the second thermal resistors 63 on the first thermal resistor 61 side. The other end of the first thermal resistor 61 and the ends of the N second thermal capacitors 64 on the other side are connected to the other end of the first thermal capacitor 62.

If heat is generated by the wire W, the heat is accumulated in the first thermal capacitor 62 and the N second thermal capacitors 64. The first thermal capacitor 62 and the N second thermal capacitors 64 dissipate heat to the outside of the wire W via the first thermal resistor 61. With this, the wire W dissipates the heat. The temperature difference ΔT between the wire temperature Tw and the ambient temperature Ta is a temperature difference across the heat source 60.

The temperature difference circuit 24 that corresponds to the multi-stage Cauer model includes, in addition to the first resistor 70, the second resistor 71 and the first capacitor 72, N third resistors 73, a fourth resistor 74, and N second capacitors 75. N RC circuits each constituted by a third resistor 73 and a second capacitor 75 are arranged between the first capacitor 72 and the fourth resistor 74. One end of the first capacitor 72 is connected to one end of the fourth resistor 74 via the N third resistors 73. Ends of the second capacitors 75 on one side are connected to the ends of the third resistors 73 on the fourth resistor 74 side. The ends of the N second capacitors 75 on the other side and the other end of the fourth resistor are grounded. The voltage across the first capacitor 72 is output to the comparator 25.

The output current of the first current output circuit 21 is divided into a plurality of currents. The currents respectively flow through the first capacitor 72 and the N second capacitors 75. As a result, the first capacitor 72 and the N second capacitors 75 are charged. If power has accumulated in the first capacitor 72 and the N second capacitors 75, the first capacitor 72 and the N second capacitors 75 will discharge via the fourth resistor 74.

As described above, the current flow through the temperature difference circuit 24 is similar to the heat conduction in the thermal circuit of the wire W Therefore, with respect to the second example of the temperature difference circuit 24, two expressions that indicate the wire currents If and Ir are formulated. As described above, the wire current If is a wire current Ih when the temperature difference ΔT is equal to the temperature difference threshold ΔTth. The wire current Ir is a wire current Ih when the voltage Vd across the first capacitor 72 is equal to the voltage threshold Vth. A plurality of constants are determined so that Ir and If substantially match with respect to a suitable current flow period t.

As described above, when a plurality of constants of the temperature difference circuit 24 are determined, the current flow through the temperature difference circuit 24 is similar to the heat conduction in the thermal circuit of the wire W. As described above, in the thermal circuit of the wire W, if heat is generated by the wire W, the heat is accumulated in the first thermal capacitor 62 and the N second thermal capacitors 64. At this time, in the temperature difference circuit 24, the first capacitor 72 and the N second capacitors 75 are charged.

In the thermal circuit of the wire W, heat is dissipated from the first thermal capacitor 62 and the N second thermal capacitors 64 to the outside of the wire W. With this, the wire W dissipates the heat. When the heat is dissipated by the wire W, the first capacitor 72 and the N second capacitors 75 discharge. When the heat amount of the heat generated by the wire W matches the heat amount of the heat dissipated from the first thermal capacitor 62 and the N second thermal capacitors 64, the heat amounts of the heat accumulated in the first thermal capacitor 62 and the N second thermal capacitors 64 are maintained at fixed values. At this time, the voltage across the first capacitor 72 and the N second capacitors 75 is also maintained at a predetermined value. The output voltage of the temperature difference circuit 24 is higher the higher the voltage across the first capacitor 72 is.

Third Example of Temperature Difference Circuit 24

Figure 8:
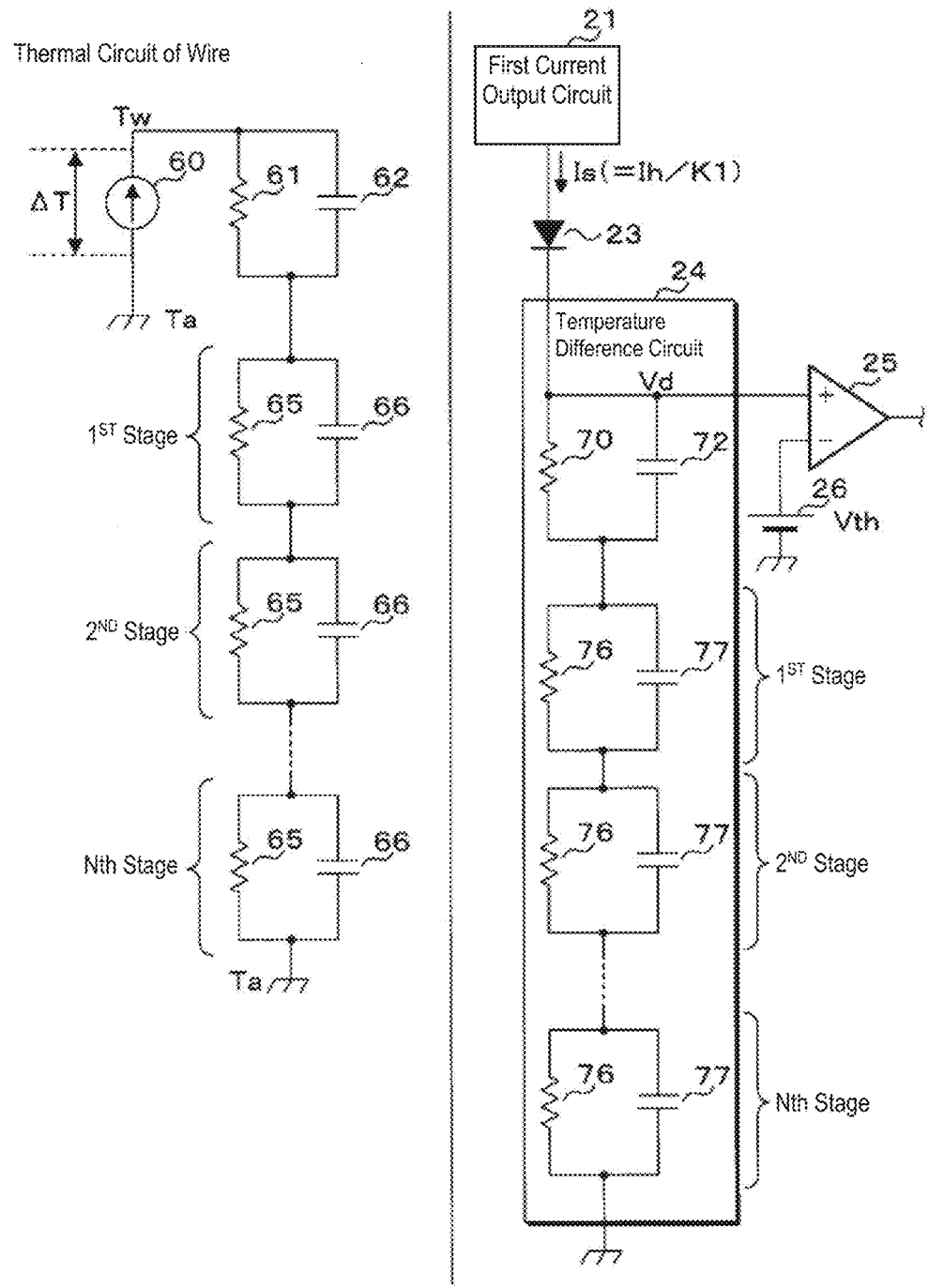
FIG. 8 is a circuit diagram illustrating a third example of the temperature difference circuit.

FIG. 8 is a circuit diagram showing a third example of the temperature difference circuit 24. In the left portion of FIG. 8, a thermal circuit of the wire W is shown. In the right portion of FIG. 8, the temperature difference circuit 24 that corresponds to the thermal circuit of the wire W is shown.

In the left portion of FIG. 8, a Foster model is shown. As shown in the left portion of FIG. 8, in the third example, the thermal circuit of the wire W includes, in addition to the heat source 60, the first thermal resistor 61 and the first thermal capacitor 62, N third thermal resistors 65 and N third thermal capacitors 66. The first thermal capacitor 62 is connected in parallel to the first thermal resistor 61. One connection node between the first thermal resistor 61 and the first thermal capacitor 62 is connected to one end of the heat source 60. The temperature at the other end of the heat source 60 is an ambient temperature. N thermal RC circuits in each of which a third thermal capacitor 66 is connected in parallel to a third thermal resistor 65 are connected in series to each other. One end of the series circuit is connected to another connection node between the first thermal resistor 61 and the first thermal capacitor 62. The temperature at the other end of the series circuit is the ambient temperature.

When heat is generated by the wire W, the heat is accumulated in the first thermal capacitor 62 and the N third thermal capacitors 66. The first thermal capacitor 62 dissipates heat via the first thermal resistor 61. In each of the thermal RC circuits, the third thermal capacitor 66 dissipates heat via the third thermal resistor 65. The temperature difference $\Delta T$ between the wire temperature Tw and the ambient temperature Ta is equal to the temperature difference between both ends of the heat source 60.

The temperature difference circuit 24 that corresponds to the multi-stage Foster model includes, in addition to the first resistor 70 and the first capacitor 72, N fifth resistors 76 and N third capacitors 77. The first capacitor 72 is connected in parallel to the first resistor 70. One connection node between the first resistor and the first capacitor 72 is connected to the cathode of the back-flow prevention diode 23 and the positive terminal of the comparator 25. N RC circuits in which a third capacitor 77 is connected in parallel to a fifth resistor 76 are connected in series to each other. One end of the series circuit is connected to the other connection node between the first resistor 70 and the first capacitor 72. The other end of the series circuit is grounded.

When an output current of the first current output circuit 21 is input to the temperature difference circuit 24, a current flows through the first capacitor 72 and the N third capacitors 77. As a result, the first capacitor 72 and the N third capacitors 77 are charged. If power has accumulated in the first capacitor 72, the first capacitor 72 will discharge via the first resistor 70. In each of the RC circuits, if power has accumulated in the third capacitor 77, the third capacitor 77 will discharge via the fifth resistor 76.

As described above, the current flow through the temperature difference circuit 24 is similar to the heat conduction in the thermal circuit of the wire W Therefore, with respect to the third example of the temperature difference circuit 24, two expressions that indicate the wire currents If and Ir are formulated. As described above, the wire current If is a wire current Ih when the temperature difference $\Delta T$ is equal to the temperature difference threshold $\Delta$Tth. The wire current Ir is a wire current Ih when the voltage Vd across the first capacitor 72 is equal to the voltage threshold Vth. A plurality of constants are determined so that Ir and If substantially match with respect to a suitable current flow period t.

As described above, when a plurality of constants of the temperature difference circuit 24 are determined, the current flow through the temperature difference circuit 24 is similar to the heat conduction in the thermal circuit of the wire W. As described above, in the thermal circuit of the wire W, if heat is generated by the wire W, the heat is accumulated in the first thermal capacitor 62 and the N third thermal capacitors 66. At this time, in the temperature difference circuit 24, the first capacitor 72 and the N third capacitors 77 are charged.

In the thermal circuit of the wire W, the first thermal capacitor 62 dissipates heat via the first thermal resistor 61. In each of the thermal RC circuits, the third thermal capacitor 66 dissipates heat via the third thermal resistor 65. With this, the wire W dissipates the heat. When the heat is dissipated by the wire W, the first capacitor 72 discharges via the first resistor 70. In each of the RC circuits, the third capacitor 77 discharges via the fifth resistor 76. When the heat amount of the heat generated by the wire W matches the heat amount of the heat radiated from the first thermal capacitor 62 and the N third thermal capacitors 66, the heat amounts of the heat accumulated in the first thermal capacitor 62 and the N third thermal capacitors 66 are maintained at fixed values. At this time, the voltage across the first capacitor 72 and the N third capacitors 77 is also maintained at a fixed value. The output voltage of the temperature difference circuit 24 is higher the higher the voltage across the first capacitor 72 is.

Embodiment 2

In Embodiment 1, the determination of whether or not the output voltage of the temperature difference circuit 24 is at least a voltage threshold is made by the comparator 25. However, the constituent component that makes the determination is not limited to the comparator 25.

The following will describe differences of Embodiment 2 from Embodiment 1. Configurations other than the configurations described below are the same as those in Embodiment 1. Therefore, the same reference numerals are given to the same constituent components as those in Embodiment 1, and descriptions of the constituent components are omitted.

Configuration of Power Supply Control Device 11

Figure 9:
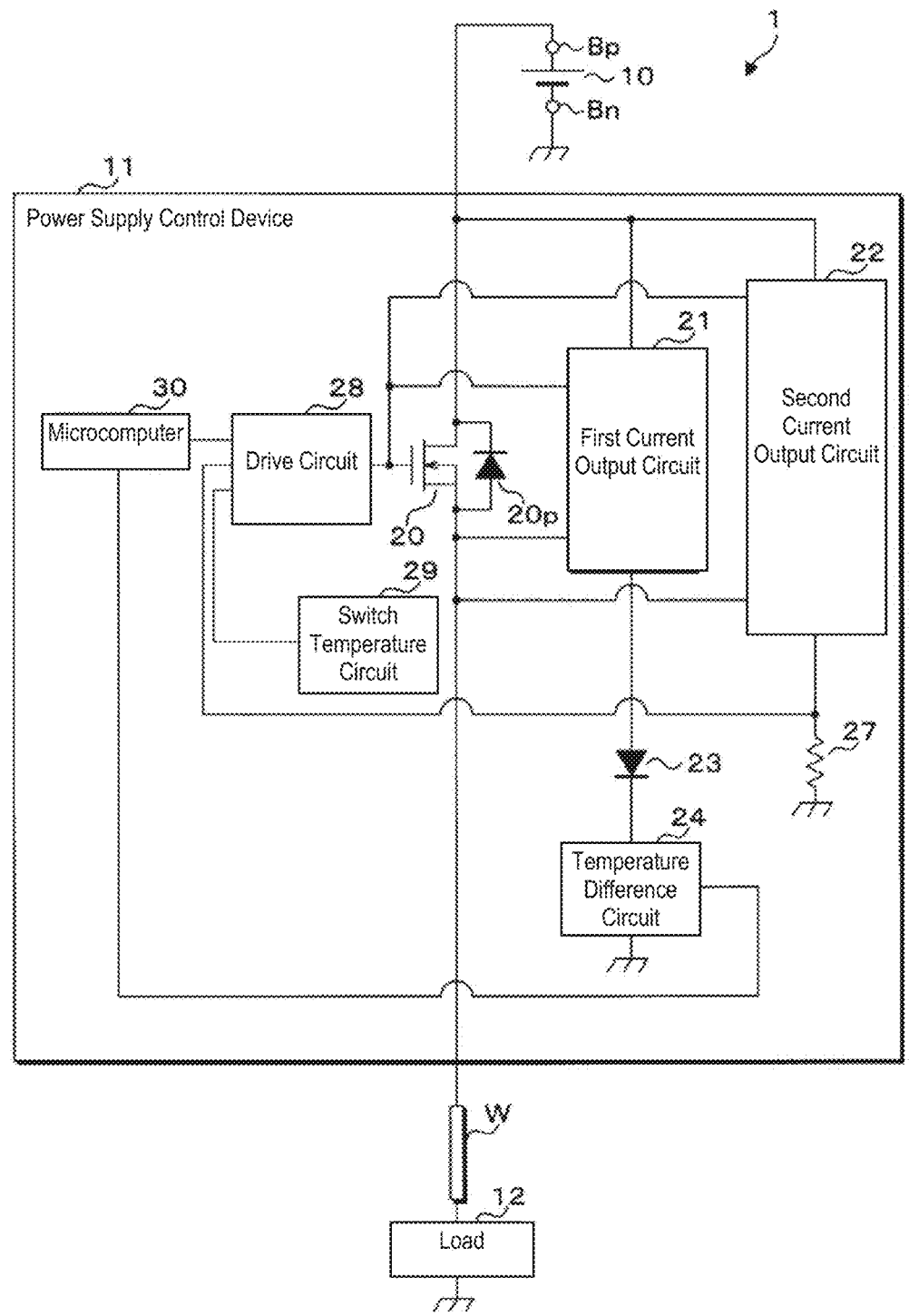
FIG. 9 is a block diagram illustrating a configuration of the main portion of a power supply control device according to Embodiment 2.

FIG. 9 is a block diagram illustrating a configuration of the main portion of the power supply control device 11 according to Embodiment 2. The power supply control device 11 according to Embodiment 2 includes the constituent components of the power supply control device 11 according to Embodiment 1, except for the comparator 25 and the DC power source 26. In the power supply control device 11 according to Embodiment 2, the temperature difference circuit 24 is connected to the microcomputer 30, instead of the comparator 25.

When the wire current is smaller than the current threshold, and the switch temperature is less than the temperature threshold, the drive circuit 28 turns the main switch 20 on or off depending on the output voltage of the microcomputer 30. The temperature difference circuit 24 outputs a voltage to the microcomputer 30.

To activate the load 12, the microcomputer 30 switches the output voltage to a high-level voltage. To deactivate the load 12, the microcomputer 30 switches the output voltage to a low-level voltage. Upon output of a high-level voltage to the drive circuit 28 by the microcomputer 30, it is determined whether or not the output voltage of the temperature difference circuit 24 is at least the voltage threshold. If it is determined that the output voltage of the temperature difference circuit 24 is at least the voltage threshold, the microcomputer 30 switches the voltage to be output to the drive circuit 28 to a low-level voltage. With this, the drive circuit 28 turns the main switch 20 off.

While the main switch 20 is on, if the wire current increases to a current greater than or equal to the current threshold or the switch temperature increases to a temperature greater than or equal to the temperature threshold, the drive circuit 28 turns the main switch 20 off regardless of the output voltage of the microcomputer 30.

Configuration of Microcomputer 30

Figure 10:
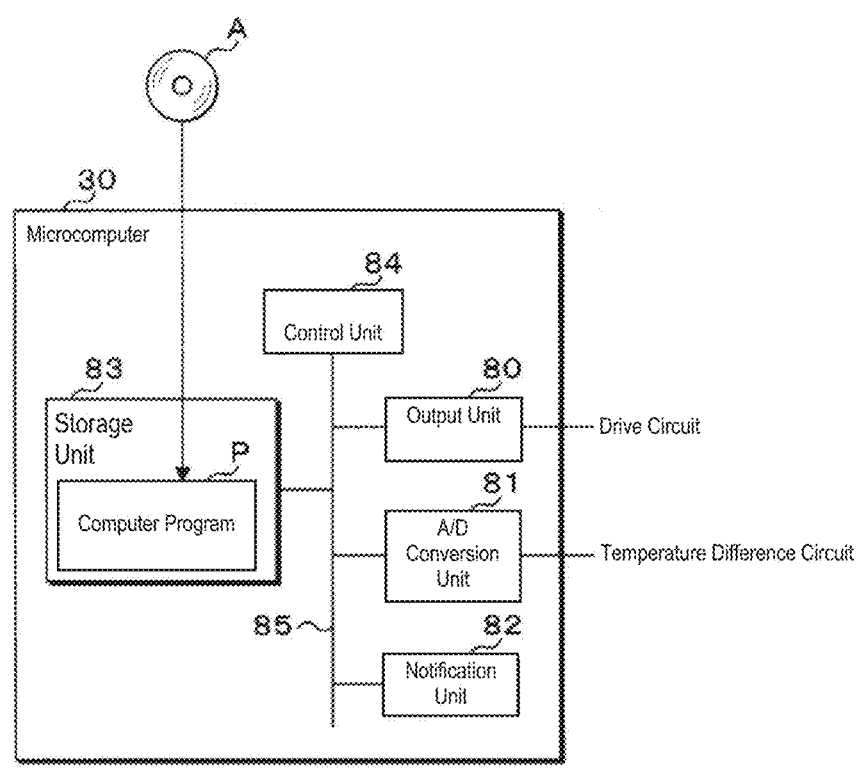
FIG. 10 is a block diagram illustrating a configuration of the main portion of a microcomputer.

FIG. 10 is a block diagram illustrating a configuration of the main portion of the microcomputer 30. The microcomputer 30 includes an output unit 80, an A/D conversion unit 81, a notification unit 82, a storage unit 83, and a control unit 84. These components are connected to an internal bus 85. The output unit 80 is further connected to the drive circuit 28. The A/D conversion unit 81 is connected to the temperature difference circuit 24.

The output unit 80 outputs a high-level voltage or a low-level voltage to the drive circuit 28. The output unit 80 switches the voltage that is output to the drive circuit 28 to a high-level voltage or a low-level voltage in accordance with an instruction of the control unit 84.

An analog value of the output voltage of the temperature difference circuit 24 is input to the A/D conversion unit 81. The A/D conversion unit 81 changes the analog value of the output voltage of the temperature difference circuit 24 to a digital value. The control unit 84 acquires, from the A/D conversion unit 81, the digital value of the output voltage of the temperature difference circuit 24.

In accordance with an instruction of the control unit 84, the notification unit 82 gives a notification that the state of the power supply control device 11 is abnormal. The notification unit 82 performs abnormality notification by transmitting a signal, displaying a message, or the like.

The storage unit 83 is a nonvolatile memory. A computer program P is stored in the storage unit 83. The control unit 84 includes a processing element for executing processing, for example, a CPU (Central Processing Unit). The control unit 84 functions as a processing unit. The processing element (computer) of the control unit 84 executes the computer program P to execute power supply control processing for controlling power supply to the load 12.

Note that the computer program P may be stored in a non-transitory storage medium A so that it can be readable by the processing element of the control unit 84. In this case, the computer program P that is read from the storage medium A by a not-shown reading device is written into the storage unit 83. Examples of the storage medium A include an optical disk, a flexible disk, a magnetic disk, a magneto-optical disk, and a semiconductor memory. The optical disk is a CD (Compact Disc)-ROM (Read Only Memory), a DVD (Digital Versatile Disc)-ROM, a BD (Blu-ray (registered trademark) Disc), or the like. The magnetic disk is, for example, a hard disk. Also, a computer program P may be downloaded from a not-shown external device connected to a not-shown communication network, and the downloaded computer program P may be written into the storage unit 83.

The number of processing elements of the control unit 84 is not limited to 1, and may be 2 or more. If the control unit 84 includes two processing elements, the plurality of processing elements may cooperate to execute the power supply control processing.

Power Supply Control Processing

Figure 11:
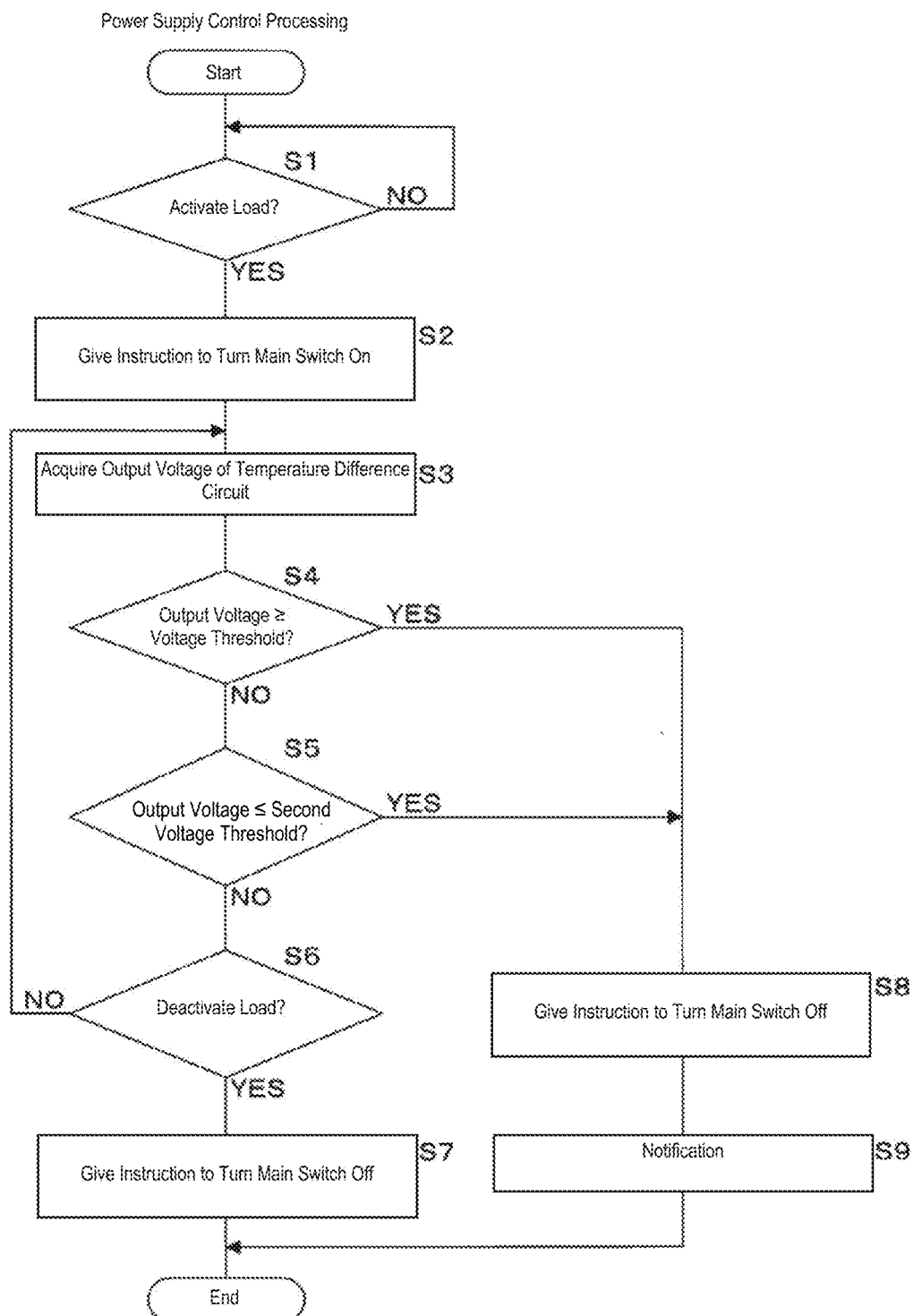
FIG. 11 is a flowchart illustrating a procedure of power supply control processing.

FIG. 11 is a flowchart illustrating a procedure of the power supply control processing. The control unit 84 executes the power supply control processing in a state in which the main switch 20 is off. In the power supply control processing, the control unit 84 determines whether or not to activate the load 12 (step S1). In step S1, the control unit 84 determines to activate the load 12 if, for example, a not-shown communication unit has received an activation signal for giving an instruction to activate the load 12. The control unit 84 determines not to activate the load 12 if the communication unit has not received such an activation signal. If it is determined not to activate the load 12 (NO in step S1), the control unit 84 executes step S1 again, and stands by until a timing is right to activate the load 12.

If it is determined to activate the load 12 (YES in step S1), the control unit 84 causes the output unit 80 to output a high-level voltage, and instructs the drive circuit 28 to turn the main switch 20 on (step S2). With this, the drive circuit 28 turns the main switch 20 on. After the execution of step S2, the control unit 84 acquires, while the main switch 20 is on, the output voltage (digital value) of the temperature difference circuit 24 from the A/D conversion unit 81 (step S3). While the main switch 20 is on, a wire current is flowing. Then, the control unit 84 determines whether or not the output voltage of the temperature difference circuit 24 acquired in step S3 is at least the voltage threshold (step S4).

If it is determined that the output voltage of the temperature difference circuit 24 is smaller than the voltage threshold (NO in step S4), the control unit 84 determines whether or not the output voltage of the temperature difference circuit 24 acquired in step S3 is not greater than a second voltage threshold (step S5). The second voltage threshold is a fixed value and is preset. The second voltage threshold is zero V or a positive value near zero V. The second voltage threshold is smaller than the voltage threshold. The control unit 84 executes step S3 after a predetermined time period has passed after the execution of step S2. Then, the control unit 84 repeatedly executes step S3 while the output unit 80 outputs a high-level voltage. When the main switch 20 is turned on, that is, a wire current starts flowing, the output voltage of the temperature difference circuit 24 instantaneously exceeds the second voltage threshold. Accordingly, when the temperature difference circuit 24 is in the normal state, the output voltage acquired in step S3 is greater than the second voltage threshold.

If it is determined that the output voltage of the temperature difference circuit 24 is greater than the second voltage threshold (NO in step S5), the control unit 84 determines whether or not to deactivate the load 12 (step S6). In step S6, the control unit 84 determines to deactivate the load 12 if, for example, the communication unit of the microcomputer 30 has received a deactivation signal for giving an instruction to deactivate the load 12. The control unit 84 determines not to deactivate the load 12 if the communication unit of the microcomputer 30 has not received such a deactivation signal. If it is determined not to deactivate the load 12 (NO in step S6), the control unit 84 executes step S3 again. The main switch 20 is maintained to be on until the output voltage of the temperature difference circuit 24 decreases to a voltage greater than or equal to the voltage threshold, the output voltage of the temperature difference circuit 24 decreases to a voltage smaller than or equal to the second voltage threshold, or a timing is right to deactivate the load 12.

If it is determined to deactivate the load 12 (YES in step S6), the control unit 84 causes the output unit 80 to output a low-level voltage, and instructs the drive circuit 28 to turn the main switch 20 off (step S7). With this, the drive circuit 28 turns the main switch 20 off. After the execution of step S7, the control unit 84 ends the power supply control processing. In this case, after the completion of the power supply control processing, the control unit 84 executes the power supply control processing again.

If it is determined that the output voltage of the temperature difference circuit 24 is at least the voltage threshold (YES in step S4), or the output voltage of the temperature difference circuit 24 is smaller than or equal to the second voltage threshold (YES in step S5), the control unit 84 causes the output unit 80 to output a low-level voltage, and instructs the drive circuit 28 to turn the main switch 20 off (step S8). With this, the drive circuit 28 turns the main switch 20 off. As described above, when the main switch 20 is turned off, the flow of the wire current is interrupted. After the execution of step S8, the control unit 84 instructs the notification unit 82 to give a notification that the state of the power supply control device 11 is abnormal (step S9). After the execution of step S9, the control unit 84 ends the power supply control processing. In this case, the control unit 84 does not execute the power supply control processing again. Accordingly, the main switch is maintained to be off.

Effects of the Power Supply Control Device 11

As described above, the determination of whether or not the output voltage of the temperature difference circuit 24 is at least the voltage threshold is made by the control unit 84 of the microcomputer 30. Even in this case, the power supply control device 11 in Embodiment 2 has the same effects as those of the power supply control device 11 of Embodiment 1. Also, in the power supply control device 11 of Embodiment 2, by the control unit 84 determining whether or not the output voltage of the temperature difference circuit 24 is not greater than the second voltage threshold, an abnormality of the temperature difference circuit 24 is detected.

Embodiment 3

In Embodiment 3, similar to Embodiment 2, the microcomputer 30 may determine whether or not the output voltage of the temperature difference circuit 24 is smaller than the second voltage threshold.

The following will describe differences of Embodiment 3 from Embodiment 1. Configurations other than the configurations described below are the same as those in Embodiment 1. Therefore, the same reference numerals are given to the same constituent components as those in Embodiment 1, and descriptions of the constituent components are omitted.

Configuration of Power Supply Control Device 11

Figure 12:
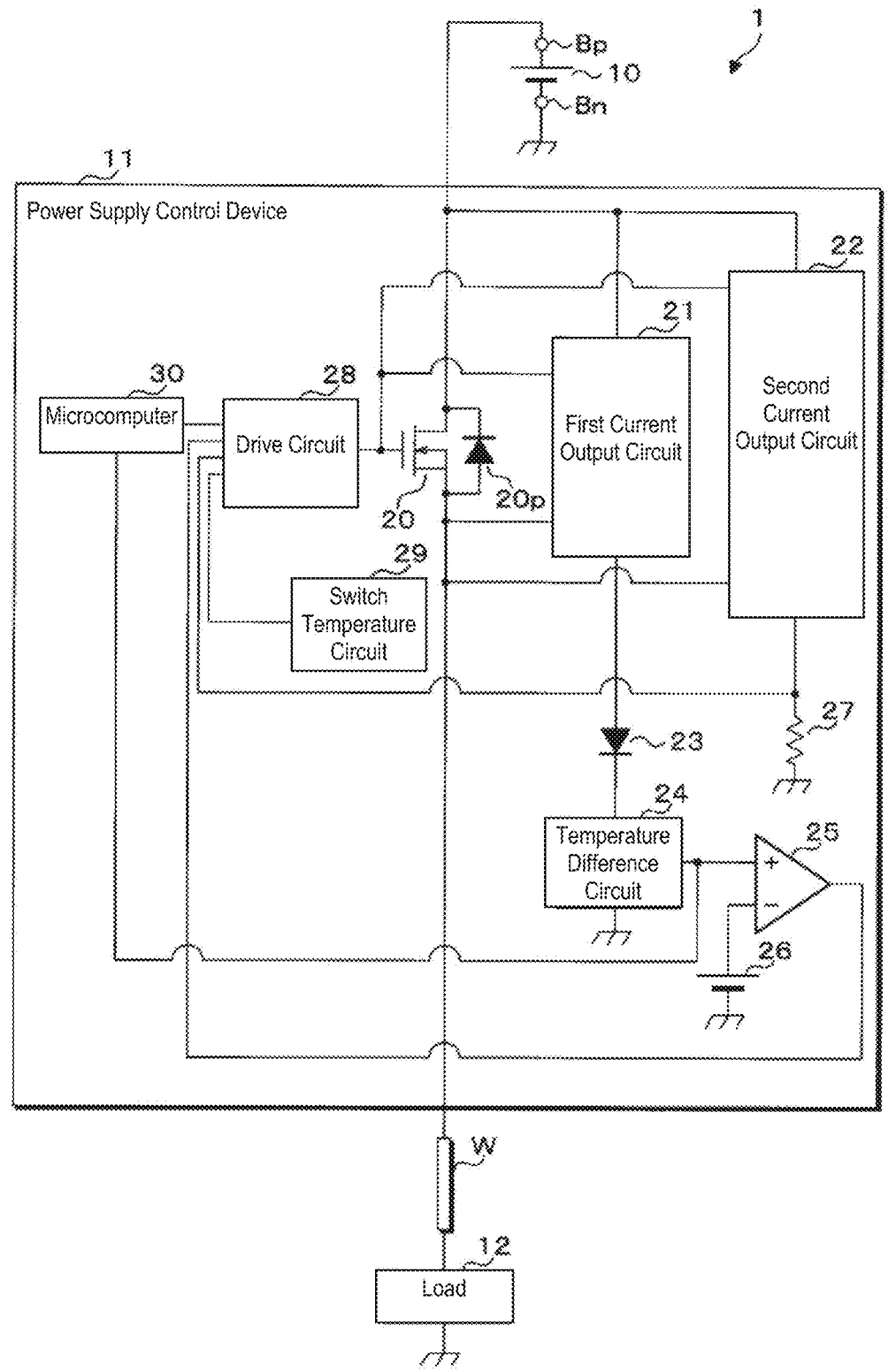
FIG. 12 is a block diagram illustrating a configuration of the main portion of a power supply control device according to Embodiment 3.

FIG. 12 is a block diagram illustrating a configuration of the main portion of the power supply control device 11 according to Embodiment 3. In the power supply control device 11 according to Embodiment 3, the temperature difference circuit 24 is connected to the positive terminal of the comparator 25 as well as to the microcomputer 30. The output voltage of the temperature difference circuit 24 is output to the positive terminal of the comparator 25, and to the microcomputer 30.

Configuration of Microcomputer 30

The microcomputer 30 has the same configuration as that in Embodiment 2. Accordingly, the output voltage (analog value) of the temperature difference circuit 24 is output to the A/D conversion unit 81. The control unit 84 of the microcomputer 30 executes the computer program P to execute power supply control processing.

Power Supply Control Processing

Similar to Embodiment 2, the control unit 84 executes power supply control processing while the main switch 20 is off. In the power supply control processing in Embodiment 3, the control unit 84 executes steps S1 to S3, and S5 to S9 of the power supply control processing of Embodiment 2. In the power supply control processing in Embodiment 3, the control unit 84 does not need to determine whether or not the output voltage of the temperature difference circuit 24 is at least the voltage threshold. Accordingly, after step S3, the control unit 84 executes step S5.

Effects of Power Supply Control Device 11

The power supply control device 11 according to Embodiment 3 has the same effects as those of the power supply control device 11 according to Embodiment 2.

Modifications

In Embodiments 1 to 3, the back-flow prevention diode 23 only needs to be provided in a current path for a current to flow through the first current output circuit 21. Accordingly, the back-flow prevention diode 23 may also be provided, for example, between the drain of the main switch 20 and the first current output circuit 21. Also, in Embodiments 1 to 3, the determination of whether or not the switch temperature is at least the temperature threshold may also be made by the microcomputer 30 instead of the drive circuit 28. The determination of whether or not the wire current is at least the current threshold may also be made by the microcomputer 30 instead of the drive circuit 28.

In Embodiments 1 to 3, it is assumed that, when no back-flow prevention diode 23 is provided, and the positive electrode and the negative electrode of the vehicle power source 10 are respectively connected to the negative electrode terminal Bn and the positive electrode terminal Bp, a current flowing through the temperature difference circuit 24 and the first current output circuit 21 in this order is small. In this case, the power supply control device 11 of Embodiments 1 to 3 does not need to include any back-flow prevention diode 23. In this configuration, the first current output circuit 21 is directly connected to the temperature difference circuit 24.

With respect to Embodiments 1 to 3, as shown in FIG. 6, the flow of a wire current is interrupted before the wire W generates smoke, even in a configuration in which, instead of interruption based on a switch temperature, interruption based on a wire current and interruption based on a temperature difference are performed. Therefore, in Embodiments 1 to 3, the power supply control device 11 may also have a configuration in which interruption based on a switch temperature is disabled. In this case, the power supply control device 11 does not need to include the switch temperature circuit 29. The interruption based on a wire current is performed when the wire current is greater than or equal to the current threshold.

Also, with respect to Embodiments 1 to 3, as shown in FIG. 6, the flow of a wire current is interrupted before the wire W generates smoke, even in a configuration in which instead of interruption based on a wire current, interruption based on a switch temperature and interruption based on a temperature difference are performed. Accordingly, in Embodiments 1 to 3, the power supply control device 11 may also have a configuration in which interruption based on a wire current is disabled. In this case, the power supply control device 11 does not need to include the second current output circuit 22 and the current resistor 27.

Furthermore, with respect to Embodiments 1 to 3, as shown in FIG. 6, the flow of a wire current is interrupted before the wire W generates smoke, even in a configuration in which instead of interruption based on a wire current and interruption based on a switch temperature, only interruption based on a temperature difference is performed. Accordingly, in Embodiments 1 to 3, the power supply control device 11 may also have a configuration in which only interruption based on a temperature difference is enabled. In this case, the power supply control device 11 does not need to include the second current output circuit 22, the current resistor 27, and the switch temperature circuit 29.

The main switch 20 and the sub switch 40 are not limited to N-channel FETs, and each switch may also be a P-channel FET, a bipolar transistor, or the like. An example of the bipolar transistor is an IGBT (Insulated Gate Bipolar Transistor). The transistor 41 is not limited to a P-channel FET, and may be a PNP bipolar transistor. If a switch without any parasitic diode is used as the sub switch 40, or a transistor without any parasitic diode is used as the transistor 41, there is no need of providing any back-flow prevention diode 23.

Also, a back-flow prevention diode may also be provided in a current path for a wire current, in order to prevent a current from flowing through the load 12, the wire W, and the main switch 20 in this order. Similarly, a back-flow prevention diode may also be provided in a current path for a current to flow through the second current output circuit 22, in order to prevent a current from flowing through the current resistor 27 and the second current output circuit 22 in this order.

Furthermore, in the first current output circuit 21 and the second current output circuit 22, a resistor may be provided in place of the sub switch 40.

The disclosed Embodiments 1 to 3 are to be construed as being exemplary and non-limiting in all respects. The scope of the present disclosure is defined by the claims rather than the above-described meaning, and all modifications within the meaning and scope equivalent to the claims are intended to be included.

The invention claimed is:

1. A power supply control device for controlling power supplied via a wire, comprising:
a current output circuit configured to output a current that is larger the larger a wire current, which flows through the wire, is, wherein the current output circuit includes a sub switch in series with a transistor and a differential amplifier, wherein the current output by the current output circuit is output through the transistor and the differential amplifier provides an input to a gate of the transistor;
a temperature difference circuit to which the current output by the current output circuit is input, and which is configured to output a voltage that is higher the larger a temperature difference between a wire temperature of the wire and an ambient temperature in the surroundings of the wire is, wherein the temperature difference circuit includes a capacitor, the capacitor is charged if heat is generated by the wire, and the capacitor discharges if heat is dissipated by the wire, and the output voltage of the temperature difference circuit is higher the higher a voltage across the capacitor is; and
an interruption unit configured to interrupt a flow of the wire current if the output voltage of the temperature difference circuit is at least a voltage threshold.

2. The power supply control device according to claim 1, further comprising:
a switch provided in a current path for the wire current, wherein the interruption unit turns the switch off to interrupt the flow of the wire current.

3. The power supply control device according to claim 2, wherein the interruption unit turns the switch off if a switch temperature of the switch is at least a temperature threshold.

4. The power supply control device according to claim 1, further comprising:
a processing unit for executing processing,
wherein the processing unit is configured to:
acquire an output voltage of the temperature difference circuit while the wire current flows, and
determine whether or not the acquired output voltage is at least the voltage threshold, and
if it is determined by the processing unit that the output voltage is at least the voltage threshold, the interruption unit interrupts the flow of the wire current.

5. The power supply control device according to claim 1, wherein the interruption unit interrupts the flow of the wire current if the wire current is at least a current threshold.

6. The power supply control device according to claim 1, further comprising:
a diode provided in a second current path for the current output by the current output circuit to flow through.

7. A power supply control device for controlling power supplied via a wire, comprising:
a current output circuit configured to output a current that is larger the larger a wire current, which flows through the wire, is, wherein the current output circuit includes a sub switch in series with a transistor and a differential amplifier, wherein the current output by the current output circuit is output through the transistor and the differential amplifier provides an input to a gate of the transistor;
a temperature difference circuit to which the current output by the current output circuit is input, and which is configured to output a voltage that is higher the larger a temperature difference between a wire temperature of the wire and an ambient temperature in the surroundings of the wire is;
an interruption unit configured to interrupt a flow of the wire current if the output voltage of the temperature difference circuit is at least a voltage threshold; and a processing unit for executing processing, wherein the
processing unit is configured to:
acquire an output voltage of the temperature difference
circuit while the wire current flows, and
determine whether or not the acquired output voltage is
not greater than a second voltage threshold,
wherein
the second voltage threshold is smaller than the voltage
threshold.

* * * * *